US011518205B2

(12) United States Patent
Pampattiwar et al.

(10) Patent No.: US 11,518,205 B2
(45) Date of Patent: Dec. 6, 2022

(54) SMART CABLE SYSTEM FOR A TRUCK TRAILER

(71) Applicant: Grote Industries, Inc., Madison, IN (US)

(72) Inventors: Sankalp Pampattiwar, Madison, IN (US); Yogesh Kubal, Madison, IN (US); Cesar Perez-Bolivar, Madison, IN (US); Adam Slade, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 503 days.

(21) Appl. No.: 16/691,886

(22) Filed: Nov. 22, 2019

(65) Prior Publication Data

US 2020/0171900 A1 Jun. 4, 2020

Related U.S. Application Data

(60) Provisional application No. 62/772,825, filed on Nov. 29, 2018, provisional application No. 62/772,833, filed on Nov. 29, 2018.

(51) Int. Cl.
*H04W 4/80* (2018.01)
*H04W 76/10* (2018.01)
(Continued)

(52) U.S. Cl.
CPC ............ *B60D 1/64* (2013.01); *H01R 13/665* (2013.01); *H01R 13/7175* (2013.01);
(Continued)

(58) Field of Classification Search
CPC .... B60D 1/64; H01R 13/665; H01R 13/7175; H01R 2201/26; H04L 12/40;
(Continued)

(56) References Cited

U.S. PATENT DOCUMENTS 5,739,592 A * 4/1998 Rigsby ..................... B60D 1/62
701/32.7
7,082,488 B2 7/2006 Larson et al.
(Continued)

FOREIGN PATENT DOCUMENTS

JP 2008 155906 A 7/2008
JP 2011-098214 A 5/2011
(Continued)

OTHER PUBLICATIONS

Search Report and Written Opinion of corresponding PCT/US2019/062758 dated Mar. 10, 2020.
(Continued)

*Primary Examiner* — Andrew Wendell
(74) *Attorney, Agent, or Firm* — Woodard Emhardt Henry Reeves & Wagner LLP

(57) ABSTRACT

A cable system for a truck trailer with connectors having a main power connection, a ground connection, and one, two, or more communication cable connections. Connectors include at least a power and ground connection for electrically connecting an individual trailer to the cable system. A master control circuit may be included in the trailer nosebox, and the master control circuit configured to send commands to slave control circuits mounted within the connectors. The slave control circuits in the connectors are configured to receive a control command sent by the master control circuit that may include an address, mode identifiers, or other indications of which connectors in the cable system should take action, and what actions should be taken.

25 Claims, 15 Drawing Sheets

(51) Int. Cl.
  *B60D 1/64* (2006.01)
  *H01R 13/66* (2006.01)
  *H01R 13/717* (2006.01)
  *H04L 12/40* (2006.01)
(52) U.S. Cl.
  CPC .......... *H04L 12/40* (2013.01); *H01R 2201/26* (2013.01); *H04L 2012/40215* (2013.01); *H04L 2012/40273* (2013.01)
(58) Field of Classification Search
  CPC ........... H04L 2012/40215; H04L 2012/40273; H04B 3/542; H04B 2203/5445; H04B 1/202; B60Q 1/305; B60R 16/0315; B60R 16/0231; B62D 65/16; H04W 4/80
  See application file for complete search history.

(56) References Cited

U.S. PATENT DOCUMENTS

| | | | |
|---|---|---|---|
| 7,559,902 | B2 | 7/2009 | Ting et al. |
| 8,140,143 | B2 | 3/2012 | Picard et al. |
| 8,384,551 | B2 | 2/2013 | Ross et al. |
| 8,661,915 | B2 | 3/2014 | Taylor |
| 8,736,439 | B1 | 5/2014 | Shinozuka |
| 8,961,439 | B2 | 2/2015 | Yang et al. |
| 9,186,092 | B2 | 11/2015 | Mestrovic et al. |
| 9,345,433 | B1 | 5/2016 | Shinozuka et al. |
| 9,642,470 | B2 | 5/2017 | Taylor |
| 10,325,472 | B1 | 6/2019 | Harsdorff et al. |
| 10,388,161 | B2 * | 8/2019 | Troutman ................. G07C 5/12 |
| 2002/0098718 | A1 * | 7/2002 | Harmon .................. B60D 1/62 439/35 |
| 2002/0189867 | A1 * | 12/2002 | Rice ..................... G01G 19/021 177/199 |
| 2011/0015498 | A1 | 1/2011 | Mestrovic et al. |
| 2012/0083902 | A1 * | 4/2012 | Daum .................... H04B 3/548 700/3 |
| 2012/0253234 | A1 | 10/2012 | Yang et al. |
| 2013/0107045 | A1 * | 5/2013 | Soderlind ................. B60R 1/04 348/148 |
| 2015/0177080 | A1 | 6/2015 | Esposito et al. |
| 2015/0254956 | A1 | 9/2015 | Shen et al. |
| 2016/0206242 | A1 | 7/2016 | Esposito et al. |
| 2016/0214551 | A1 | 7/2016 | Armacost |
| 2018/0018864 | A1 | 1/2018 | Baker |
| 2018/0048182 | A1 * | 2/2018 | Chan .................... G01R 31/396 |
| 2018/0201156 | A1 * | 7/2018 | Mangette ........ B60W 30/18172 |
| 2020/0118361 | A1 * | 4/2020 | Zula ..................... G01M 17/007 |

FOREIGN PATENT DOCUMENTS

| | | |
|---|---|---|
| JP | 2016 203731 A | 12/2016 |
| WO | WO 2012/078244 A1 | 6/2012 |
| WO | WO 2014/093888 A2 | 6/2014 |
| WO | WO 2018/044430 A1 | 3/2018 |
| WO | WO 2018/156178 A1 | 8/2018 |

OTHER PUBLICATIONS

International Search Report for PCT/US2019/02248 dated Mar. 16, 2018.
Written Opinion in PCT/US2019/02248 dated Jun. 20, 2019.

* cited by examiner

Fig. 26

| | | 2004 | 2006 | 2008 | 2014 | 2022 | 2024 | 2026 | 2034 Stop | 2034 Turn | 2036 Stop | 2036 Turn |
|---|---|---|---|---|---|---|---|---|---|---|---|---|
| OPERATING MODE | (Prior Art) Left Turn | | | | F | | | | | F | | |
| | Left Turn | F | F | F | F | | | | F | F | | |
| | Left Turn | F | F | F | F | F | | | F | F | | |
| | (Prior Art) Braking | | | | | O | O | O | O | O | O | |
| | Braking | | | | F | O | O | O | O | O | O | O |
| | (Prior Art) Left Turn & Stop | | | | | F | O | O | O | F | O | |
| | Left Turn & Stop | F | F | F | F | F | O | O | O | F | O | |
| | Left Turn & Stop | F | F | F | F | F | O | O | O | F | O | |

2605, 2610, 2615, 2620, 2625, 2630, 2635, 2640

Key: F: Lamps on, flashing  
O: Lamps on, steady  
Empty: Lamp off

2600

SMART CABLE SYSTEM FOR A TRUCK TRAILER

CROSS-REFERENCE TO RELATED APPLICATIONS

This application claims the benefit of U.S. Provisional Patent Application No. 62/772,825 filed Nov. 29, 2018 and U.S. Provisional Patent Application No. 62/772,833 filed Nov. 29, 2018, both of which are hereby incorporated by reference.

BACKGROUND

Cable systems for truck trailers are limited because each functional aspect of the wiring system in the trailer requires its own separate power line directly connecting the lamp or other trailer component exercising that function to a corresponding circuit in the tractor. This was more important in the past when incandescent bulbs were used for lighting that required significantly more power than more recent lamps which use Light Emitting Diodes (LEDs) which are considerably more efficient. With LEDs replacing incandescent bulbs, the current requirement for trailer wiring has been lowered, and thus there is no longer a need for larger gauge wires carrying current for each function.

Each wire in a conventional cabling system is generally limited in what it may be used for because it is often electrically connected to deliver power only to specific portions of the trailer lighting system. The truck is usually configured to provide power on a particular line according to the activities of the driver (e.g. activating turn signals, applying brakes, etc.) thus the conventional system is limited by these specific connections. For example, the same wires used to power the brake lights generally cannot be used to power the left or right turn signals. Conventional systems also commonly require different pigtails with different wiring configurations to connect lamps with different dedicated functions to the wiring system.

Also, more recently, trailers often include other electronic devices such as sensors for monitoring the state of the trailer and the load, cameras for providing additional visibility behind and adjacent to the trailer, additional exterior or interior lighting to aid in maintenance or loading and unloading, or other electronic devices that preferably interact with the truck tractor to name a few nonlimiting examples. However, with a limited number of electrical connections between the trailer and the tractor, and with each connection being dedicated to possibly only one function, conventional trailer cabling systems cannot easily accommodate the growing number of electronic devices used in trailers.

SUMMARY

Disclosed is a cable system for a trailer having a nosebox, a power cable, a ground cable, and at least one communication cable mounted to the trailer. In another aspect, the nosebox has multiple connection terminals corresponding to trailer connection terminals of a truck tractor. In another aspect, the connection terminals may include a ground cable connection and six separate power cable connections, and a master control circuit mounted in the nosebox. The master control circuit may be electrically connected to the connection terminals, the power cable, ground cable, and communication cable(s).

In another aspect, the master control circuit is optionally configured to accept control input from the truck tractor via the power cable connections and to generate component control commands for controlling one or more individual trailer components mounted to the trailer. In another aspect, the master control circuit is optionally configured to send the control commands to the trailer components via the at least one communication cable.

In another aspect, the multiple trailer component connectors optionally include a power connection terminal for electrically connecting the individual trailer components to the power cable, a ground connection terminal for electrically connecting the individual trailer components to the power cable, and a slave control circuit electrically connected to the power cable, ground cable, and the at least one communication cable. The slave control circuit is optionally configured to receive the control commands sent by the master control circuit and to selectively control one of the individual trailer components according to the control commands.

In another aspect, the master control circuit optionally includes a master microcontroller, and a master transceiver electrically connected to the master microcontroller and to the at least one communication cable.

In another aspect, the slave control circuit optionally includes a slave microcontroller and a slave transceiver electrically connected to the slave microcontroller and to the at least one communication cable, wherein the slave microcontroller receives the control commands sent by the master transceiver using the slave transceiver.

In another aspect, the cable system optionally includes two communication cables electrically connected to the master control circuit, wherein the master control circuit includes a Control Area Network (CAN) controller electrically connected to the communication cables, and/or wherein the slave control circuit includes a slave CAN controller, and wherein the master and slave control circuits communicate using a CAN protocol.

In another aspect, the cable system optionally includes one communication cable electrically connected to the master control circuit, wherein the master control circuit includes a Local Interconnect Network (LIN) controller electrically connected to the communication cable, and/or wherein the slave control circuit includes a slave LIN controller, and wherein the master and slave control circuits communicate using a LIN protocol.

In another aspect, the slave control circuits optionally define a mode identifier, and wherein the control commands sent by the master control circuit include a target mode identifier specifying the trailer component the control command is intended for, and wherein the slave control circuits may be configured to: compare the target mode identifier in the control commands received from the master control circuit with the mode identifier of the slave control circuit, and electrically connect the individual trailer component to the power cable when the target mode identifier matches the mode identifier of the slave control circuit.

In another aspect, the one or more trailer components optionally includes at least five rear-facing lamps mounted at the rear of the trailer, the at least five rear-facing lamps mounted in five separate trailer component connectors having separate addresses, and wherein the master control circuit may be configured to: accept brake input from the truck tractor, and send control commands with target addresses associated with the at least five rear-facing lamps.

In another aspect, the slave control circuits of the multiple trailer component connectors optionally include multiple dual position switches for defining the mode identifier of the slave control circuits.

In another aspect, the master control circuit optionally includes control logic configured to process input from the truck tractor and generate one or more control commands specific to one or more of the individual trailer components.

In another aspect, the master control circuit optionally includes a maintenance interface configured to receive the control logic from a remote device.

In another aspect, the individual trailer optionally components include vehicle stop-tail-turn lamps, vehicle turn signal lamps, vehicle brake lamps, vehicle tail lamps, vehicle running lamps, vehicle anti-lock brakes, vehicle interior illumination lamps, vehicle reverse lamps, or any combination thereof.

In another aspect, the individual trailer components may include an antilock brake system controller, pressure sensors, temperature sensors, door sensors, cargo sensors, cargo length sensors, liquid level sensors, refrigeration sensors, or any combination thereof.

In another aspect, the power connection terminal, the ground connection terminal, and the slave control circuit may be partially or fully contained within a unitary molded structure.

In another aspect, one of the individual trailer components is a lamp having one or more LEDs, and the slave control circuit includes an outage detection circuit configured to determine an operational status of the one or more LEDs, and wherein the slave control circuit is configured to send data about the operational status to the master control circuit using the at least one communication cable.

In another aspect, one of the individual trailer components is a temperature sensor, and the slave control circuit is configured to accept temperature data from the temperature sensor and to send the temperature data to the master control circuit using the at least one communication cable.

In another aspect, one of the individual trailer components is a backup camera, and the slave control circuit is configured to accept image data from the backup camera and to send the image data to the master control circuit using the at least one communication cable.

Also disclosed is a connector for trailer components in a truck trailer, comprising a main power connection, a ground connection, and at least one communication cable connection. The connector optionally includes a component power connection for electrically connecting an individual trailer component to power, a component ground connection for electrically connecting the individual trailer component to ground, and a slave control circuit electrically connected to the component power connection, the component ground connection, the main power connection, the ground connection, and the at least one communication cable connection.

The slave control circuit is optionally configured to receive a control command sent by a master control circuit using the at least one communication cable connection, and the control commands optionally include a mode identifier, and electrically connect the component power connection to the main power connection to provide power to the individual trailer component when the mode identifier in the control command matches a component mode identifier stored in the slave control circuit. In another aspect the disclosed connector includes an optional mode selector configured to accept input defining the component mode identifier.

In another aspect, the connector includes a housing, wherein one end of the main power connection, ground connection, at least one communication cable connection, component power connection and component ground connection terminates within the housing, wherein the slave control circuit is enclosed within the housing, and wherein a portion of the mode selector extends outside the housing.

In another aspect, the connector includes a housing that includes a unitary molded structure formed from polymeric material.

In another aspect, the mode selector includes multiple dual position switches, and wherein the mode identifier is defined by the positions of the switches.

In another aspect, the connector includes a maintenance interface configured to receive the component mode identifier from a remote device, and a memory configured to store the component mode identifier.

In another aspect, the main power connection, ground connection, and at least one communication cable connection are optionally electrically connected to a master control circuit mounted in a trailer nosebox of the trailer, wherein the master control circuit is configured to accept control input from a truck tractor, and wherein the master control circuit is configured to generate different component control commands specific to one or more individual trailer components based on the control input.

In another aspect, the trailer nosebox includes seven connection terminals corresponding to trailer connection terminals of a truck tractor, the seven connection terminals including a ground cable connection and six separate power cable connections.

In another aspect, the individual trailer component is a lamp having one or more LEDs, and the slave control circuit includes an outage detection circuit configured to determine an operational status of the one or more LEDs, and wherein the slave control circuit is configured to send data about the operational status to the master control circuit using the at least one communication cable.

In another aspect, the individual trailer component is a temperature sensor, and the slave control circuit is configured to accept temperature data from the temperature sensor and to send the temperature data to the master control circuit using the at least one communication cable.

In another aspect, the individual trailer component is a backup camera, and the slave control circuit is configured to accept image data from the backup camera and to send the image data to the master control circuit using the at least one communication cable.

Further forms, objects, features, aspects, benefits, advantages, and examples of the disclosed concepts will become apparent from the detailed description and drawings provided herewith.

BRIEF DESCRIPTION OF THE DRAWINGS

FIG. 26 is a table illustrating examples of operational aspects of the disclosed system.

DETAILED DESCRIPTION

Figure 1:
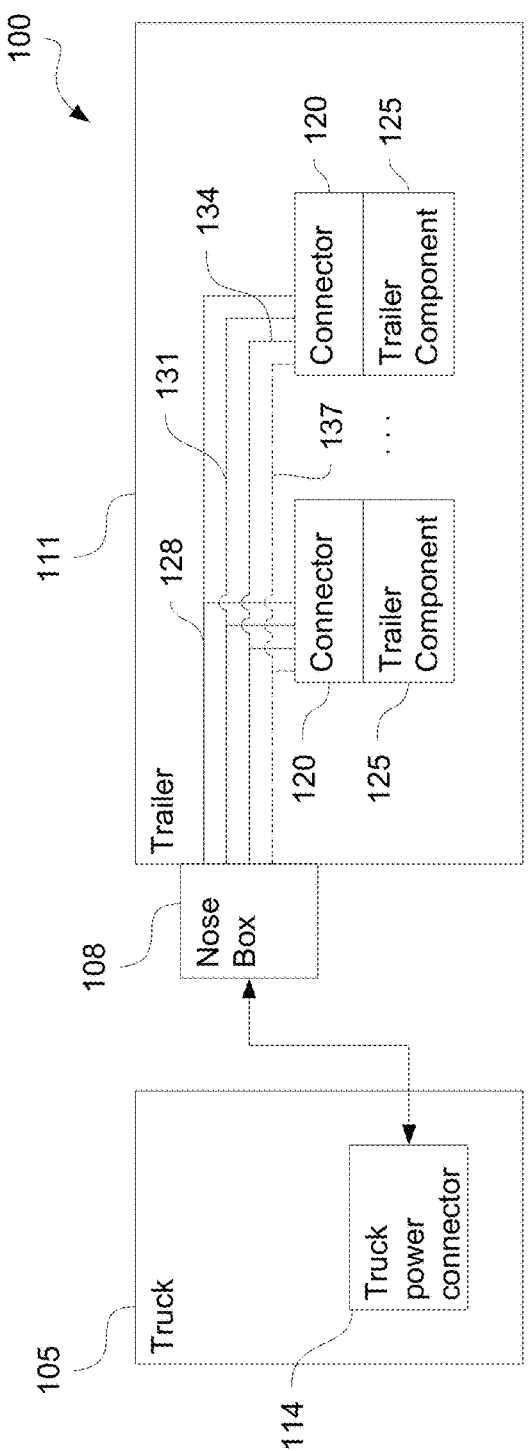
FIG. 1 is a component diagram illustrating one example of components that may be included in a cable system for a trailer.

FIG. 1, illustrates at 100 components that may be included in a cable system for a trailer 111. A cable system for a trailer 100 may include multiple components mounted to trailer 111 such as a power cable 128, a ground cable 131, and at least one communication cable 134. It may also include a nose box 108 mounted to trailer 111, nose box 108 having multiple trailer component connectors 120. Multiple connection terminals may be included that correspond to trailer connection terminals of a truck 105, the connection terminals including a ground cable connection and multiple separate power cable connections. The multiple separate power cable connections may include three or more, four or more, five or more, six or more, seven or more, or any other suitable number of power cable connections.

Figure 2:
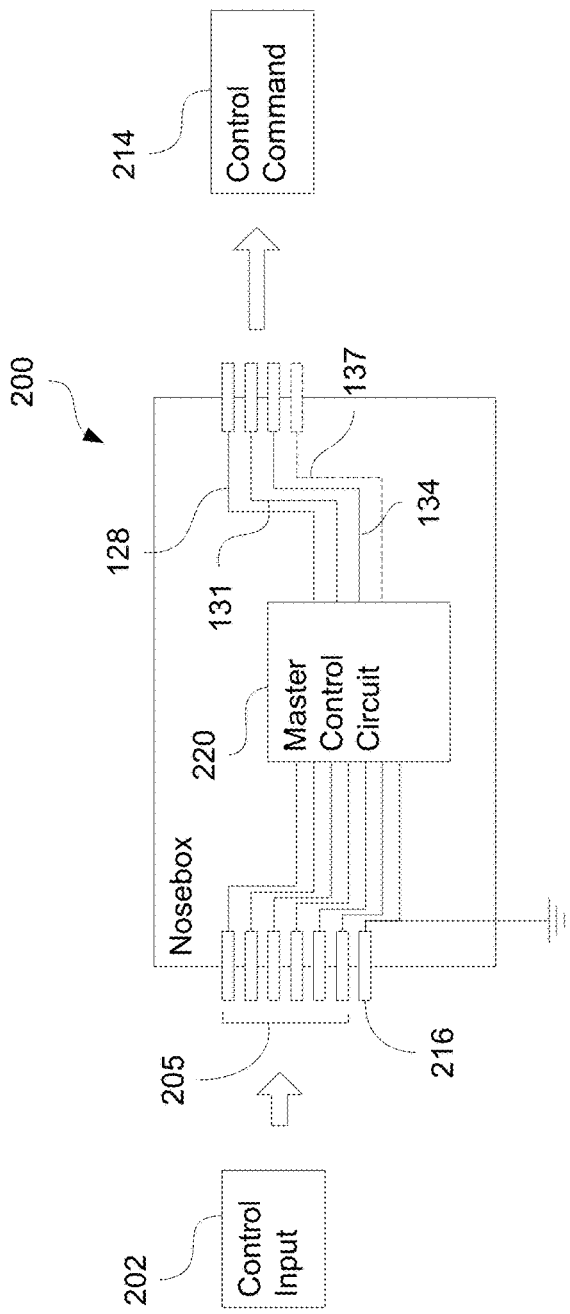
FIG. 2 is a component diagram illustrating components that may be included in a nose box like the one shown in the FIG. 1.

FIG. 2 illustrates some additional examples of components that may be included in a nose box 200 like the one shown in the FIG. 1. Nose box 200 may include multiple connection terminals that are configured to accept power and/or control input 202 from truck 105 and thus the multiple connection terminals may be arranged and configured to correspond to trailer connection terminals of truck 105. In the example of FIG. 2, the connection terminals include six separate power cable connections 205 and a ground cable connection 216. A master control circuit 220 may be mounted in the nose box 200, the master control circuit 220 electrically connected to the seven connection terminals 205, 216. These connection terminals may be included inside nose box 200, or may extend through nose box 200 to engage a cable electrically connecting the connection terminals to truck 105.

In one example, nose box 200 may include a connector and terminals configured to conform to the Society of Automotive Engineers (SAE) J-560 standard. Under the J-560 standard, separate circuits are included in a truck trailer cabling system where each circuit is dedicated to provide power to trailer components during particular modes of operation. For example, a yellow wire may be dedicated to the left turn signal and hazard lamps, a green wire may be dedicated to operate the right turn signal and hazard lamps, and a black wire may be dedicated for clearance side marker and identification lamps. In some situations, multiples of these circuits may be powered by truck 105 in order to activate the trailer components they are connected to at the same time. In other situations, one circuit may be selectively powered while others are not. Generally speaking, each circuit in a J-560 power distribution circuit is designed to receive power based on driver input that engages the system to operate in a particular mode of operation (e.g. turn signal to activate flashers, brake pedal pressed to activate brake lights, etc.) In this way control input 202 may be defined simply as truck 105 selectively providing power to one or more of separate power cable connections 205.

The master control circuit 220 is also electrically connected to power cable 128, ground cable 131, communication cable 134, and the optional additional communication cable 137. The master control circuit 220 is optionally configured to accept control input 202 from truck 105 via separate power cable connections 205 and to generate and send control commands 214 for controlling one or more individual trailer components 125 mounted to trailer 111. In another aspect, master control circuit 220 may be configured to send control commands 214 to the trailer components 125 via communication cables 134. Master control circuit 220 may also be configured to use optional additional communication cable 137 to send control commands 214 as discussed in further detail below.

Figure 3:
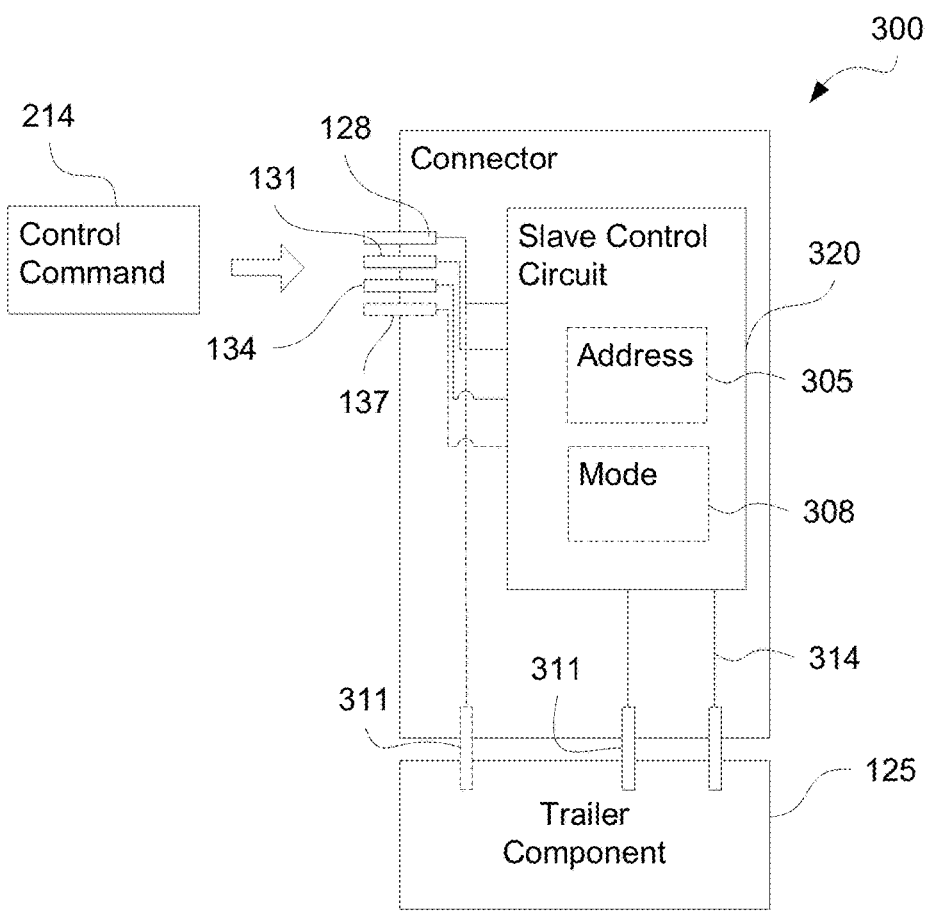
FIG. 3 is a component diagram illustrating components that may be included in a trailer component connector like the one shown in the FIG. 1.

Thus FIG. 3 illustrates a trailer component connector 300 that includes a main power connection provided by power cable 128, a ground connection provided by ground cable 131, and at least one communication cable connection provided by communication cable 134 and the optional additional communication cable 137. A component power connection is provided by power connection terminal 311 which is configured to electrically connect an individual trailer component 125 to the main power connection. A component ground connection is provided by ground connection terminal 314 which is configured to electrically connect the individual trailer component 125 to the ground connection.

Electrical connections between power cable 128 and power connection terminal 311, and between ground cable 131 and ground connection terminal 314 are controlled by slave control circuit 320 that is configured to selectively electrically connect the component power connection and the component ground connection to the main power connection, the ground connection, based on input received by the at least one communication cable connection. This allows slave control circuit 320 to communicate with a master control circuit 220, and to thus activate, and deactivate an individual trailer component 125 by selectively connecting, for example, the component power and ground connections of trailer component 125 to the main power and/or ground connections.

In another aspect illustrated in FIG. 3, slave control circuit 320 may be configured to only control the connection from ground connection terminal 314 to ground cable 131, while power connection terminal 311 may be continuously connected to power cable 128. In this example, slave control circuit 320 is configured to selectively activate and deactivate trailer component 125 by controlling the ground connection portion of the circuit providing power to trailer component 125.

In another aspect, the main power connection, ground connection, and at least one communication cable connection electrically connects slave control circuit 320 to master control circuit 220 mounted in the nose box 108 of trailer 111. In this example, master control circuit 220 is configured to accept control input from truck 105, and is configured to generate different control commands 214 specific to one or more individual trailer components 125 based on control input 202.

In another aspect, slave control circuit 320 may include an address 305 uniquely identifying slave control circuit 320 separately from all other slave control circuits 320 in trailer 111. Slave control circuit 320 may maintain address 305 in a memory such as a nonvolatile memory device or logic circuit. In another example, slave control circuit 320 optionally defines address 305 using an arrangement of mechanical switching devices arranged in a predetermined order. In another aspect, slave control circuit 320 may be remotely updatable without requiring any physical manipulation to adjust the address.

In another aspect, slave control circuit 320 may include one or more modes 308 identifying a single mode, or optionally multiple modes, of operation under which slave control circuit 320 will operate. For example, modes of operation may correspond with driver inputs such as applying input using a brake pedal, turn signal, steering wheel, transmission gear selector, or by providing user input using a user interface such as a touchscreen, buttons, and the like mounted in the operator's compartment of truck 105. These modes of operation may be defined by any suitable means such as by receiving power applied to one of separate power cable connections 205. In one example, some or all slave control circuits 320 may be sent the same control command 214 which may include one or more modes 308. Slave control circuit 320 may receive command 214 and compare the modes in the command to the modes control circuit 320, and then activate, deactivate, or otherwise change state as required by the detailed instructions in command 214 when those modes of operation specified in control commands 214 match the mode 308 stored in slave control circuit 320.

Figure 4:
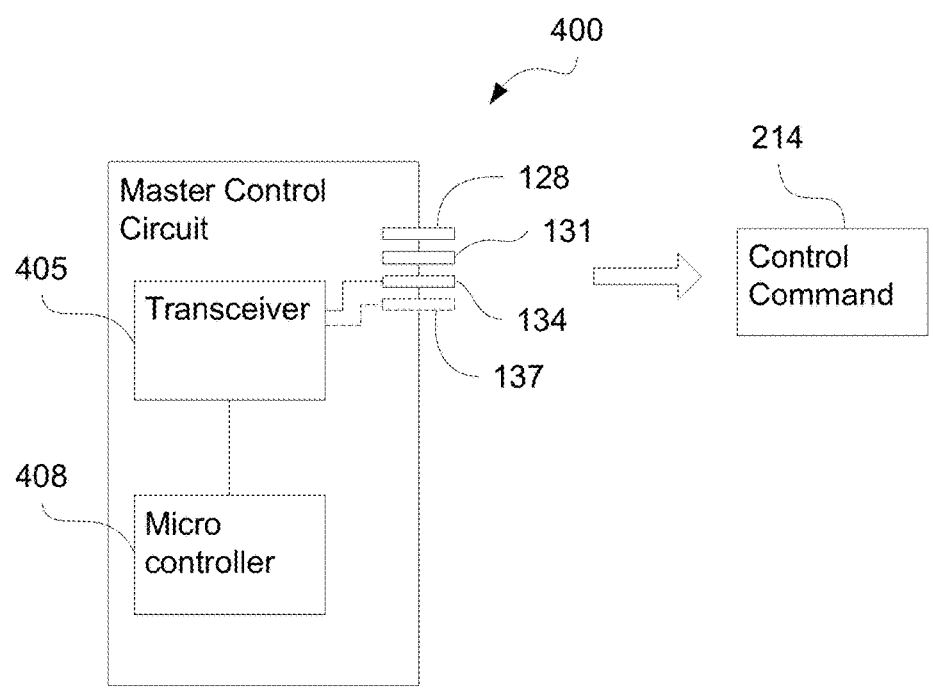
FIG. 4 is a component diagram illustrating components that may be included in a master control circuit like the one shown in the FIG. 2.

FIG. 4 illustrates additional aspects that may be included in a master control circuit 400 like the one shown in the FIG. 2. In FIG. 4, the master control circuit includes a master microcontroller 408 electrically connected to a master transceiver 405. Master transceiver 405 is electrically connected to communication cable 134, and the optional additional communication cable 137 thus providing master control circuit 400 the ability to communicate control commands 214 to one or more trailer components 125. Master microcontroller 408 may be programmed or otherwise configured to implement a wide array of control functions which translate control input 202 received from truck 105 into control commands 214. Commands from master control circuit 400 may then be sent to many, if not all, trailer components 125 in trailer 111. For example, multiple trailer components 125 may be electrically connected together such as in a shared bus configuration so that some or all trailer components 125 are connected to power via power cable 128, connected to ground via 131, and can all receive the same control commands 214 via communication cable 134, and the optional additional communication cable 137.

In another aspect, control commands 214 may be generated as a stream of data packets sent to trailer components 125 via 134 and (if present) 137. This stream of data packets may be assembled by master microcontroller 408 and transmitted by master transceiver 405. Master transceiver 405 may also operate as a receiver receiving response information such as data packets sent by those trailer components 125 which have acknowledged and responded to the control command 214 that was sent. Microcontroller 408 may optionally include other necessary communication or processing circuitry required by the specific implementation of the system such as a Control Area Network (CAN) controller, or a Local Interconnect Network (LIN) controller, or other implementation specific circuitry.

Figure 5:
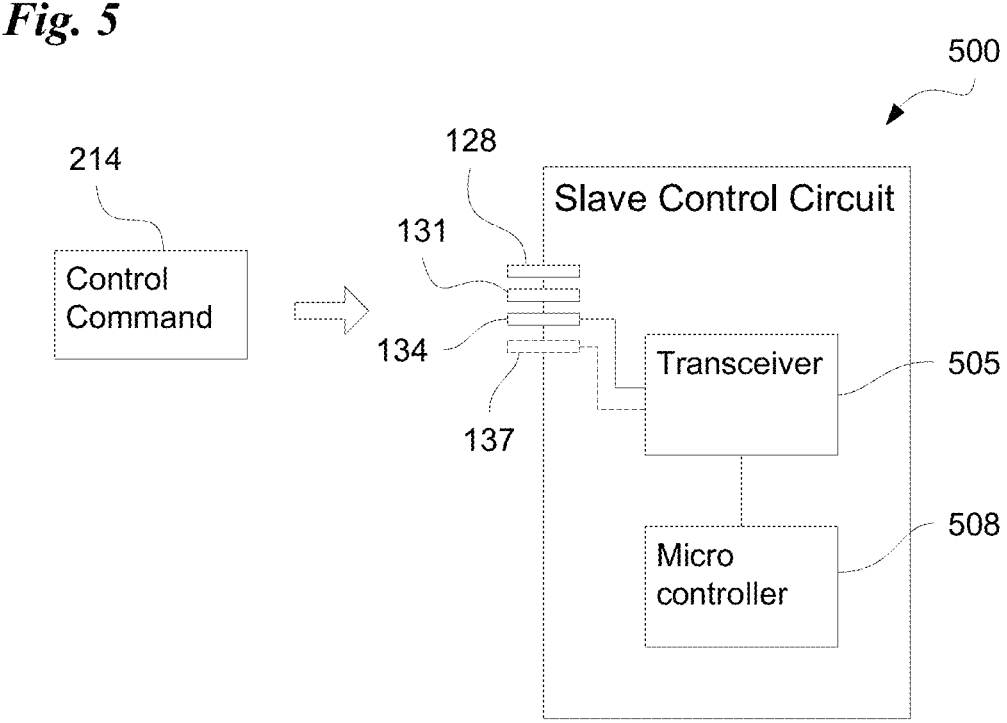
FIG. 5 is a component diagram illustrating components that may be included in a slave control circuit like the one shown in the FIG. 3.

FIG. 5 illustrates additional aspects that may be included in a slave control circuit 500 like the one shown in the FIG. 3. As shown in FIG. 5, slave control circuit 500 may include a slave microcontroller 508 electrically connected to a slave transceiver 505. Slave transceiver 505 is also electrically connected to communication cable 134, and to the optional additional communication cable 137. In this example, the slave microcontroller 508 is configured to receive control commands 214 using communication cable 134 and the optional additional communication cable 137. Control commands 214 may be sent by a master control circuit 400 using a master transceiver 405 and received using slave transceiver 505.

In another aspect, control commands 214 may be received as a stream of data packets sent to trailer components 125 via 134 (and optionally by 137 as well). This stream of data packets may be received by slave transceiver 505 and processed according to communication logic and slave microcontroller 508. This communication logic may also include processing that generates response messages to be sent back by slave transceiver 505 to a master control circuit 400 acknowledging receipt of the message, and/or providing other information such as whether the trailer component 125 successfully responded to the control command 214, or information about errors, faults, or other problems experienced by trailer component 125 in attempting to respond.

Microcontroller 508 may optionally include other necessary communication or processing circuitry required by the specific implementation of the system such as a Control Area Network (CAN) controller, or a Local Interconnect Network (LIN) controller, or other implementation specific circuitry.

Figure 6:
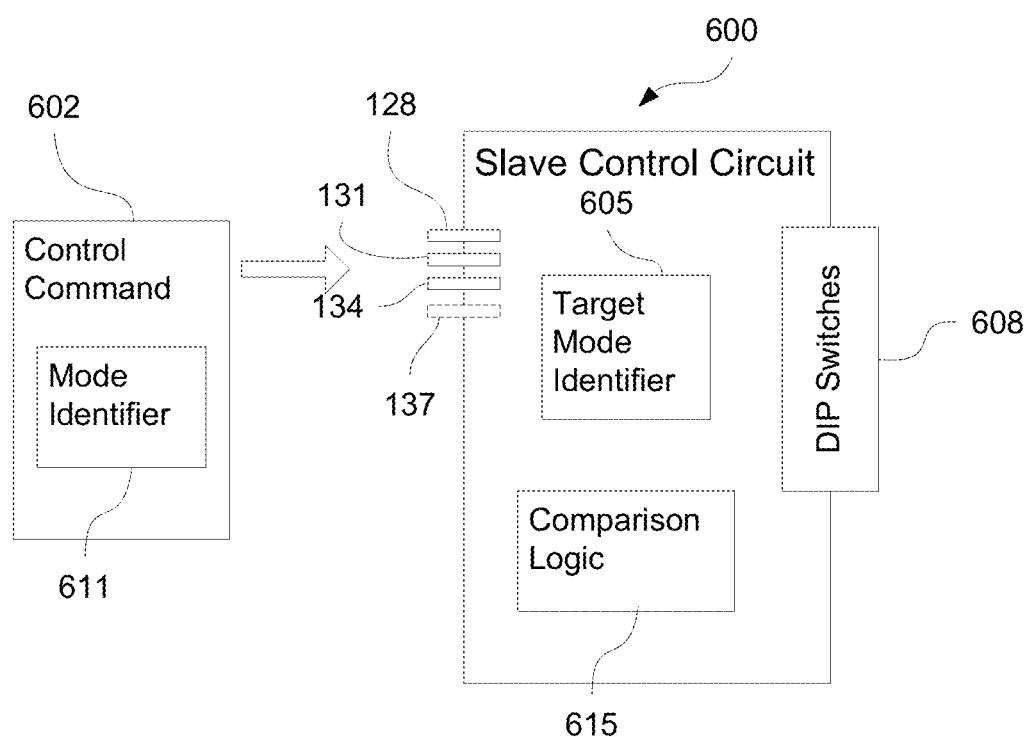
FIG. 6 is a component diagram illustrating components that may be included in a slave control circuit like the one shown in FIG. 3 and FIG. 5.

Another example of a slave controller like those shown in the preceding figures is illustrated in FIG. 6. A slave control circuit 600 defines a mode identifier 605 specifying one or more operating modes 308 the slave control circuit 600 is configured to respond to. In this example, control commands 214 may be sent to all trailer components 125 by a master control circuit with a mode identifier 611 defining a mode of operation that is currently active. In this way the system specifies which one or more trailer components 125 will respond to a control command 602. In some modes, only a select few control circuits 600 will be configured to respond and activate the attached trailer components. In other modes, most, if not all, trailer components will be activated, such as in the case of a "maintenance" mode where all components are activated at the same time to check for failed trailer components, intermittent, corroded, or broken electrical connections, or for establishing baseline current and voltage usage parameters.

In another aspect, slave control circuit 600 includes comparison logic 615 configured to compare the target mode identifier 611 in the control commands 602 received from master control circuit 400 with the mode identifier 605. Slave control circuit 600 is configured to electrically connect the individual trailer component 125 to the power cable 128 when the target mode identifier 611 matches mode identifier 605.

In another aspect, slave control circuit 600 may include one or more switches such as, for example, multiple switches 608 for defining mode identifier 605. These switches may be implemented as solid-state transistors or logic gates that may be reconfigurable based on input from a remote computing device. In another aspect, the switches may be physically actuated such as in the case of Dual In-Line Package switches (DIP), optionally packaged together in a single housing. With switches 608, mode identifier 605 may be defined by the positions of the switches 608, such as in the case of a series of switches with inputs electrically connected to power cable 128, and/or communication cable 134. Actuating switch 608 to close a specific input circuit may be used to indicate a "one", while actuating a different switch 608 to open a different input circuit may be used to indicate a "zero". In this way, a binary number may be entered into slave control circuit 600 specifying mode identifier 605. Comparison logic 615 may then access target mode identifier 605 and compare it to mode identifier 611 arriving in a control command 602 to determine whether to activate the trailer component 125 electrically connected to slave control circuit 600. When target mode identifier 611 in control command 602 matches mode identifier 605 in slave control circuit 600 according to comparison logic 615, slave control circuit 600 may be configured to electrically connect the component power connection in trailer component 125 to the main power connection provided by power cable 128.

In another aspect, activation of a trailer component 125 coupled to slave control circuit 600 may involve actions other than connecting trailer component 125 to power. For example, slave control circuit 600 may define a default "power on" mode configured to provide power to a trailer component 125 at all times. In this configuration, slave control circuit 600 may include one or more target mode identifiers 605 specifying different operating modes under which trailer component 125 is to be activated. In this example, activation may involve changing the trailer component 125 from a "standby" to an "active" operating status thus enabling other features or aspects of trailer component 125 operate. Such a configuration may be useful for trailer components 125 such as cameras or sensors which may be kept connected to power at all times while the trailer 111 is coupled to truck 105, but may be configured to begin recording or providing sensor data input to slave control circuit 600 under certain specific circumstances and not others that are defined by the operation of truck 105 and/or trailer 111.

Figure 7:
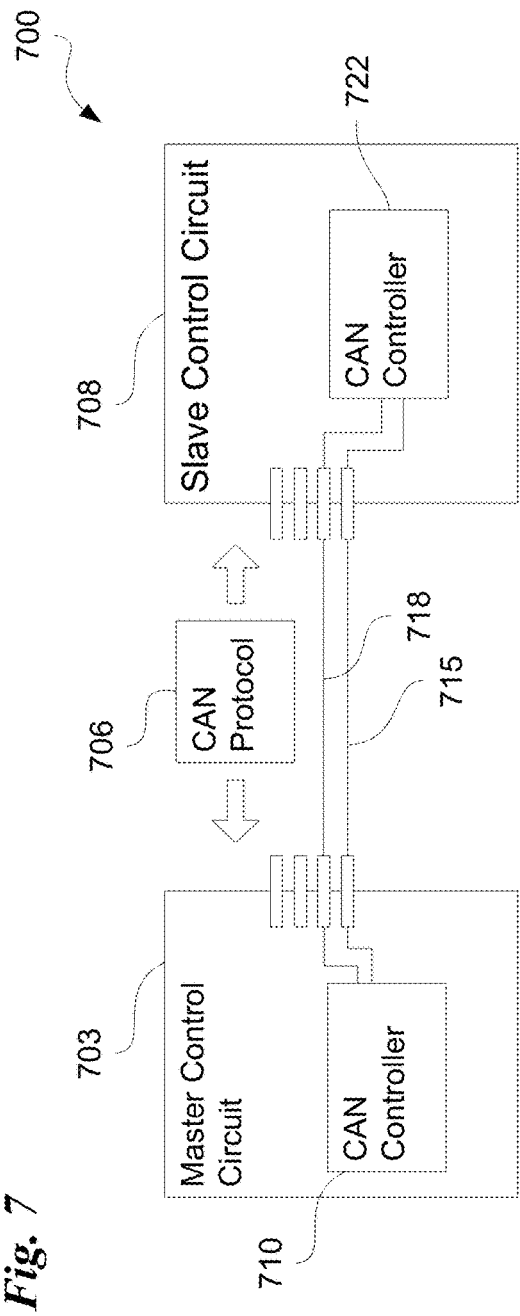
FIG. 7 is a diagram illustrating components that may be included in another example of a cable system like the one shown in FIG. 1 implemented using a Control Area Network (CAN).

FIG. 7 illustrates at 700 components that may be included in another example of a cable system like the cable system for a trailer 100 shown in FIG. 1. In this example, the cable system 700 is implemented using a Control Area Network (CAN). In the example of FIG. 7, the cable system 700 includes two communication cables, which in this example include a CAN high communication cable 718 and a CAN low communication cable 715 electrically connected to a master control circuit 703. The master control circuit 703 includes a CAN master controller 710 electrically connected to CAN high communication cable 718 and CAN low communication cable 715. The master control circuit is thus configured to send control commands 602 to a slave control circuit 708. The slave control circuit 708 may include a CAN slave controller 722 also electrically connected to CAN high communication cable 718 and CAN low communication cable 715. In this example, the master control circuit 703 and one or more slave control circuits 708 communicate using the CAN protocol 706.

Figure 8:
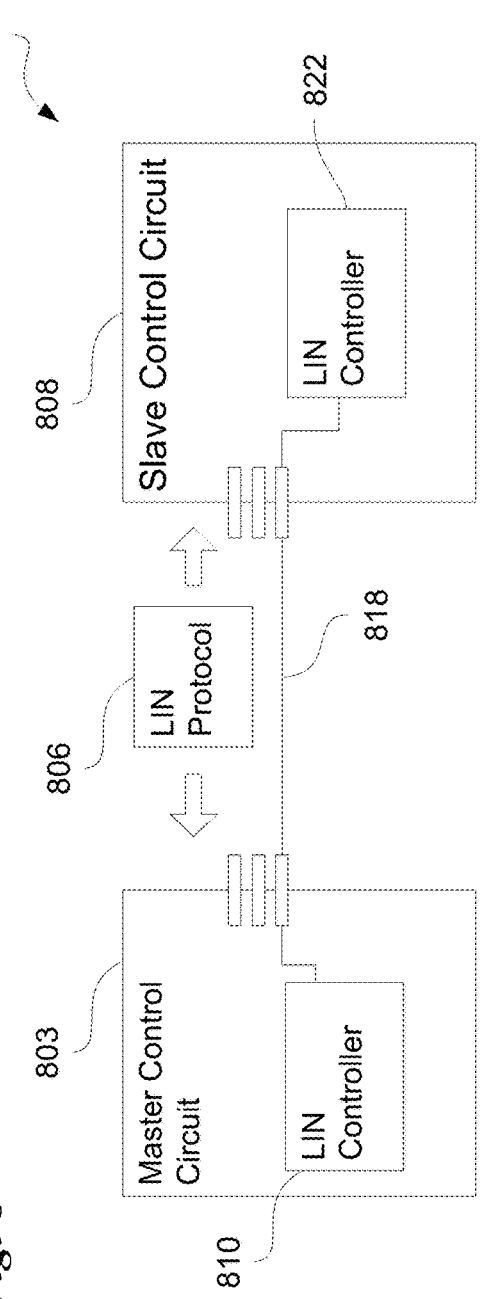
FIG. 8 is a diagram illustrating components that may be included in another example of a cable system like the one shown in FIG. 1 implemented using a Local Interconnect Network (LIN).

FIG. 8 illustrates at 800 components that may be included in another example of a cable system that is like the cable system for a trailer 100 shown in FIG. 1, but is implemented using a Local Interconnect Network (LIN). In FIG. 8, cable system 800 includes a single communication cable 818 electrically connected to a LIN master control circuit 803. The LIN master control circuit 803 includes a LIN master controller 810 electrically connected to LIN communication cable 818. The communication cable 818 is configured to send control commands 602 to a LIN slave control circuit 808. The LIN slave control circuit 808 may include a LIN slave controller 822 also electrically connected to LIN communication cable 818. In this example, the LIN master control circuit 803 and one or more LIN slave control circuits 808 communicate using the LIN Protocol 806.

Figure 9:
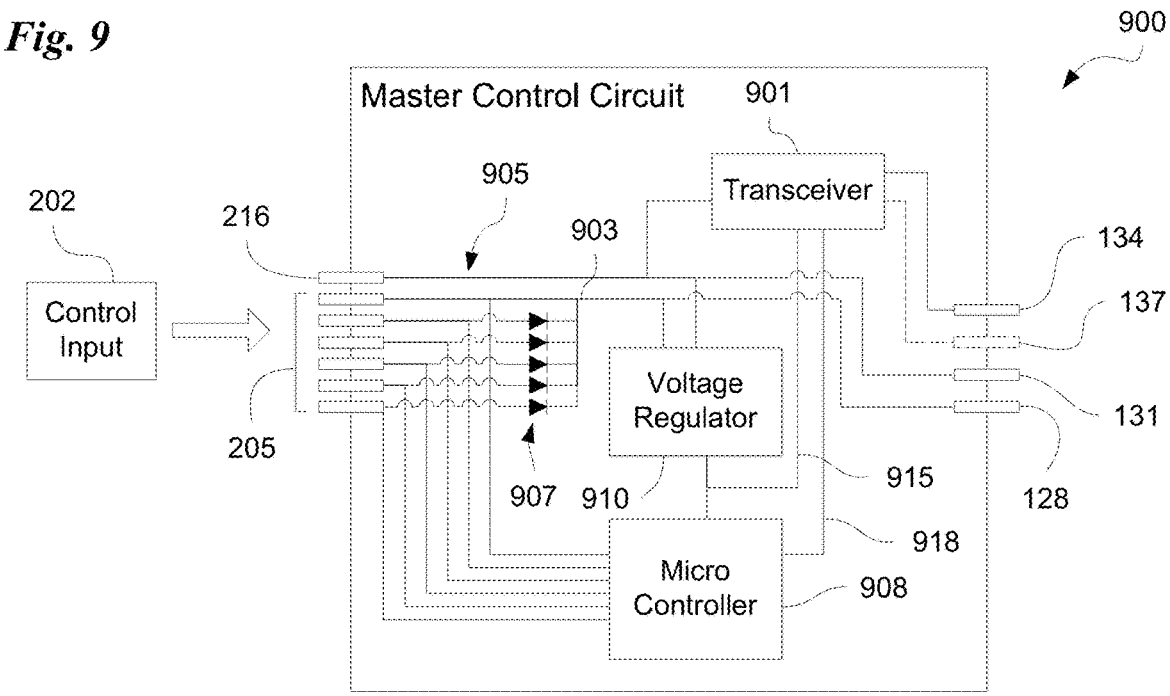
FIG. 9 is a component diagram illustrating components that may be included in a master control circuit like the ones shown in the preceding figures.
Figure 10:
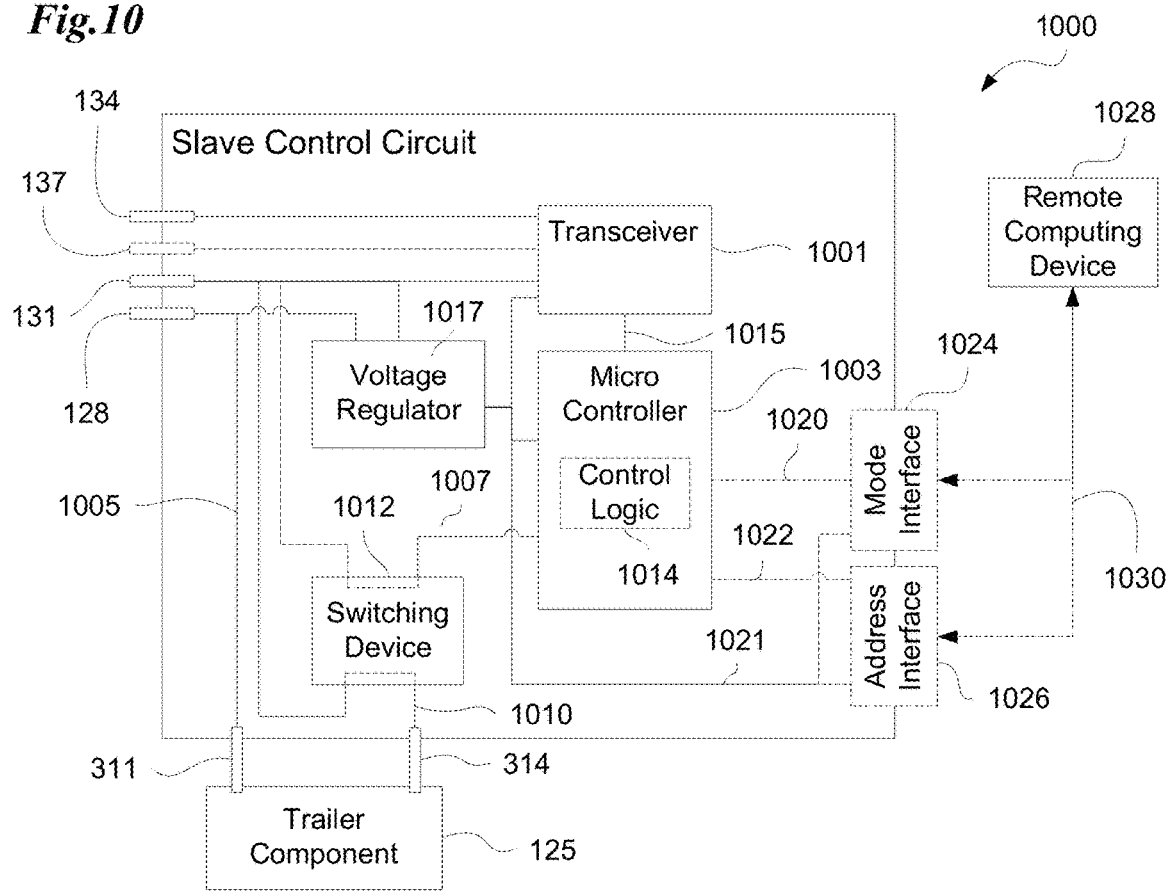
FIG. 10 is a component diagram illustrating components that may be included in a slave control circuit like the ones shown in the preceding figures.

Illustrated in FIGS. 9 and 10 is another example of control circuitry for a 3-wire or optionally a 4-wire cable system for a truck trailer like those discussed above. In FIG. 9, a master control circuit 900 includes a master microcontroller 908 electrically connected to a voltage regulator 910 and a master transceiver 901. In this example, multiple separate power cable connections 205 are combined at a power junction 905 to provide power to master control circuit 900 on a power cable 903, while a connection to ground cable connection 216 provides a ground circuit connection for the components of control circuit 900. In this example, 205 and 216 provide seven separate connections (e.g. representing seven connections of a standard J-560 power cable), six of which are coupled to power cable 903 via diode array 907. A diode array 907 may be included to reduce or eliminate return currents flowing in the opposite direction from each separate power cable connection 205 to another.

Power and ground connections within master control circuit 900 are provided by voltage regulator 910 and ground cable connection 216. Trailer components 125 downstream from master control circuit 900 receive power from 903 on power cable 128 and are connected to ground 216 via ground cable 131 respectively. Here a power circuit 915 electrically connects a power output of voltage regulator 910 to a master transceiver 901 and master microcontroller 908. Power circuit 915 may be included to provide regulated voltage and/or current to 901, 908, and possibly other devices. For example, devices in the circuit may operate on 5 V, 3.3 V, or 12 V, or some other voltage, while power provided on separate power cable connections 205 may be provided at 6 V, 12 V, 24 V, 48 V, or possibly other higher or lower voltages.

The communication cable 134 and optional additional communication cable 137 may be included to electrically connect master microcontroller 908 to slave transceivers 505 in trailer components 125 downstream from master control circuit 900. In the case of 3-wire cable system such as a LIN discussed above, communication cable 134 corresponds to LIN communication cable 818. In the case of a 4-wire cable system such as a CAN implementation discussed above, communication cable 134 corresponds to CAN high communication cable 718, and optional additional communication cable 137 is included for connecting to CAN low communication cable 715.

Operational control of master control circuit 900 is provided by master microcontroller 908. Master microcontroller 908 sends control signals on master I/O circuit 918 to other components such as master transceiver 405. In this example, control input 202 is provided to master control circuit 900 on separate power cable connections 205 based on any suitable input provided using separate power cable connections 205. Such input includes, but is not limited to changes in voltage, changes in current levels, or as time varying signals for carrying digital or analog data to master control circuit 900.

The power junction at 905 aggregates power provided by separate power cable connection 205, but also provides microcontroller 908 with separate inputs for each separate power cable connection 205 so that master microcontroller 908 can be configured to detect different operating modes based on different power levels on the separate power cable connections 205, or by any other suitable means. Connections 205 thus operate as control inputs indicating actions to be taken by trailer components 125 electrically connected to master microcontroller 908. For example, when a vehicle operator actuates the brake pedal of truck 105, the truck 105 sends power through at least one of the separate power cable connections 205. Power on this connection indicates to the master microcontroller 908 that the brake pedal has been pressed causing master microcontroller 908 to control transceiver 901 to send a message to any trailer components 125 that are electrically connected downstream from master control circuit 900 and are configured to respond to "brake pedal activation" control commands 214.

FIG. 10 illustrates another example of components that may be included in a slave control circuit like the ones shown in the preceding figures. A slave control circuit 1000 includes power cable 128 and ground cable 131 providing power and ground connections respectively to the components of slave control circuit 1000. A voltage regulator 1017 may be included to regulate the voltage provided by power cable 128 to provide power on power circuit 1021 according to the needs of a slave microcontroller 1003 and optionally some or all of the other components in the circuit such as control logic 1014. For example, microcontroller 1003 may require 5 V, 3.3 V, or 12 V, or some other suitable voltage while power provided on power cable 128 may be provided at 12 V, 24 V, 48 V, or possibly at other higher or lower voltages.

A switching device 1012 may be included and may be responsive to signals from slave microcontroller 1003 and configured to control the flow of power from power cable 128 to the trailer component 125 coupled to slave control circuit 1000. For example, switching device 1012 may include a relay configured as shown in FIG. 10 with a constant connection to power cable 128 being provided to trailer component 125 via component power circuit 1005, and a ground connection selectively provided by component activation circuit 1010 based on a control output from component control output circuit 1007. In another aspect, switching device 1012 may include a solid state switching device without internal physical moving parts that is configured to accept input from component control output circuit 1007 and to selectively electrically connect trailer component 125 to ground.

In another aspect, slave microcontroller 1003 may be configured to separately signal trailer component 125 to activate or deactivate one or more functions or features separately from the aspect of supplying or disconnecting power. Slave control circuit 1000 may include control logic 1014 which may optionally be programmed to differentiate the role of each individual trailer component 125. This role may be configured by specifying one or more operating modes slave circuit 1000 should respond to, or by specifying an address that uniquely identifies the slave control circuit (and any trailer components it is coupled too).

For example, slave microcontroller 1003 may include control logic 1014 configured to operate trailer component 125 as a left rear turn signal because of its physical location on trailer 111. The "left turn signal" mode may be stored in a memory of control logic 104. Thus control commands 214 may be sent from a master control circuit 900 specifying that this trailer component 125, and any others connected to similarly programmed circuits, should respond as defined by the control logic 1014. Some possible modes that might be specified in control command 214 and control logic 1014 include a braking mode, a left turn or right turn mode, a diagnostic mode, a hazard mode, and the like, to name a few non-limiting examples.

In another example, control logic 1014 may be configured or programmed to respond only to control commands 214 that include an address identifier that matches the address of this slave control circuit. In this example, one or more trailer components 125 may respond as a group based on the multiple address 305 of each slave control unit address specified in the command. In this example, the specific action to take may be defined by the type of message (e.g. "brake activation" message, "camera off" message, "software upgrade" message).

In yet another example, a trailer component 125 may be configured with control logic 1014 that retains both a mode 308 and an address 305, thus allowing a trailer component 125 to respond to control commands 214 specifically targeted for that trailer component 125 while also allowing the trailer component 125 to activate with other trailer components 125 as a group based on the mode 308.

In another aspect, the target mode slave microcontroller 1003 should respond to may optionally be defined by mode interface 1024 which is optionally electrically connected to slave microcontroller 1003 by mode input lines 1020. Mode interface 1024 may be configured to provide input defining the target modes that a given trailer component 125 should respond to. Mode interface 1024 may include switches, memory, logic, communication or networking components, or other circuits configured to accept and store at least one target mode identifier 611 for slave microcontroller 1003. For example, mode interface 1024 my optionally include a group of Dual Inline Package (DIP) switches arranged to receive power from voltage regulator 1017 and to selectively send that power to slave microcontroller 1003 using mode input lines 1020. In this example, the number of switches determines how many different modes the slave circuit can identify and respond to. For example, four switches could provide up to 16 different target mode identifiers, while switches could provide up to 256, and 10 up to 1024, and so on.

In another aspect, mode interface 1024 may receive one or more target mode identifiers 611 from a remote computing device 1028 via a communication link 1030. In this example, target mode identifiers 611 may be remotely installed into slave control circuit 1000. The number of different target mode identifiers 611 that may be referenced and uploaded to control logic 1014 thus being only dependent on the storage capacity of control logic 1014.

In another aspect, slave control circuit 1000 may optionally include an addressing system like the one shown in trailer component connector 300. Control logic 1014 may be configured to activate based on one or more addresses 305 defining which trailer components 125 of cable system for a trailer 100 should respond. A specific address 305 may be separately assigned to some or all of trailer component connectors 120 in the system. These addresses may be maintained by slave microcontroller 1003 such that each component connector 120 may have a different address defined therein, thus allowing individual components to be notified independently and separately from other trailer components 125.

Addressing functionality of slave control circuit 1000 may optionally be implemented by an address interface 1026. In one aspect, multiple DIP switches may be included with address interface 1026 and may be configured to specify a unique address for each trailer component 125. In this example, selectively positioning the individual switches in predetermined patterns of "on" and "off" settings may provide slave microcontroller 1003 with a binary number uniquely identifying slave control circuit 1000 and, by extension, the trailer component 125 it is coupled to.

Increasing the number of switches is one way of increasing the number of trailer components 125 that may be uniquely addressed by a master control circuit 900 in the cable system. For example, switches could address up to 16 different trailer components, while 12 could uniquely address up to 4096 trailer components 125, and so on. In another aspect, address interface 1026 may receive one or more target mode identifiers 611 from a remote computing device 1028 via a communication link 1030. In this example, target mode identifiers 611 may be remotely installed into slave control circuit 1000. The number of different target mode identifiers 611 that may be referenced and uploaded to control logic 1014 thus being only dependent on the capacity of control logic 1014.

Figure 11:
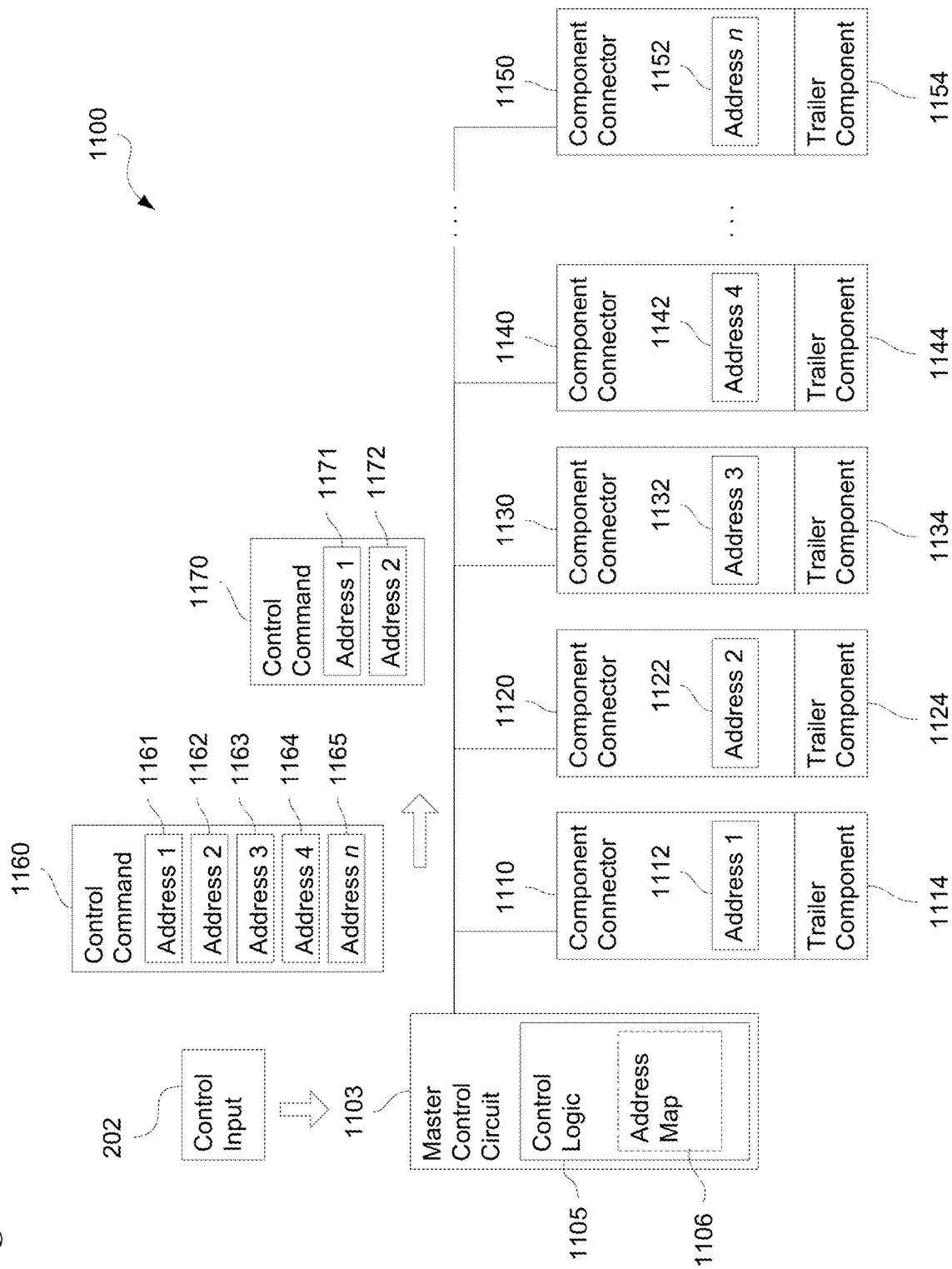
FIG. 11 is a component diagram illustrating one example of the system of the preceding figures in operation.

FIG. 11 illustrates operational aspects of a cable system 1100 like the cable system for a trailer 100 and other similar systems disclosed herein elsewhere. In FIG. 11, a master control circuit 1103 is configured to accept control input 202 and generate control commands 1160 for trailer components 1114, 1124, 1134, 1144, and 1154.

The master control circuit 1103 may be configured to individually signal trailer components 1114-1154 to activate or deactivate one or more functions or features of these components. In another aspect, control logic 1105 may be configured to automatically activate trailer components based information in control logic 1105 relating component addresses to control input 202.

In one example, a control command 1160 is generated by master control circuit 1103 and configured to define multiple separate trailer components 125 that should respond to control command by specifying multiple addresses 1161-1165. In another aspect, master control circuit 1103 may include master control logic 1105 configured to determine which trailer components 125 should be addressed for a given control input 202. In another aspect, master control circuit 1103 may include am address map 1106 specifying the relationships between different control inputs 202 and the component connectors 1110, 1120, 1130, 1140, and 1150 to activate for each input. The master control circuit 1103 may use master control logic 1105 and mode address map 1106 to process input from the truck 105 and generate one or more control commands 1160 and 1170.

For example, components 1114-1154 may be at least five rear-facing lamps mounted at the rear of trailer 111, the at least five rear-facing lamps being mounted to five separate trailer component connectors 120 and each assigned unique connector addresses 1112, 1122, 1132, 1142, and 1152. In this example, master control circuit 1103 may be configured to accept brake input as control input 202 from the truck 105 and based on this input generate a control command 1160 with corresponding matching command addresses 1161, 1162, 1163, 1164, and 1165. The master control circuit 1103 may send control command 1160 with the addresses associated with the at least five rear-facing lamps. The control command 1160 may be received by some or all component connectors 1110, 1120, 1130, 1140, and 1150 in the cable system, allowing each connector to match the addresses in control command 1160 with the addresses stored in the individual trailer component connectors 120 and either activate or deactivate the trailer components 125 accordingly.

In another example, trailer components 1114-1154 may include a rear proximity sensor trailer component 1114 and a backup camera trailer component 1124 mounted in separate trailer component connectors 120 and each assigned unique connector addresses 1112, 1122. In this example, master control circuit 1103 may be configured to accept a reverse gear selection as control input 202 from the truck 105 and based on this input generate a control command 1170 with corresponding command addresses 1171 and 1172 matching 1110 and 1120. The master control circuit 1103 may generate and send control command 1170 to all trailer components 125 allowing each to match the addresses in control command 1170 with the addresses stored in the trailer component connectors 120 and either activate or deactivate the trailer components 125 accordingly.

Figure 12:
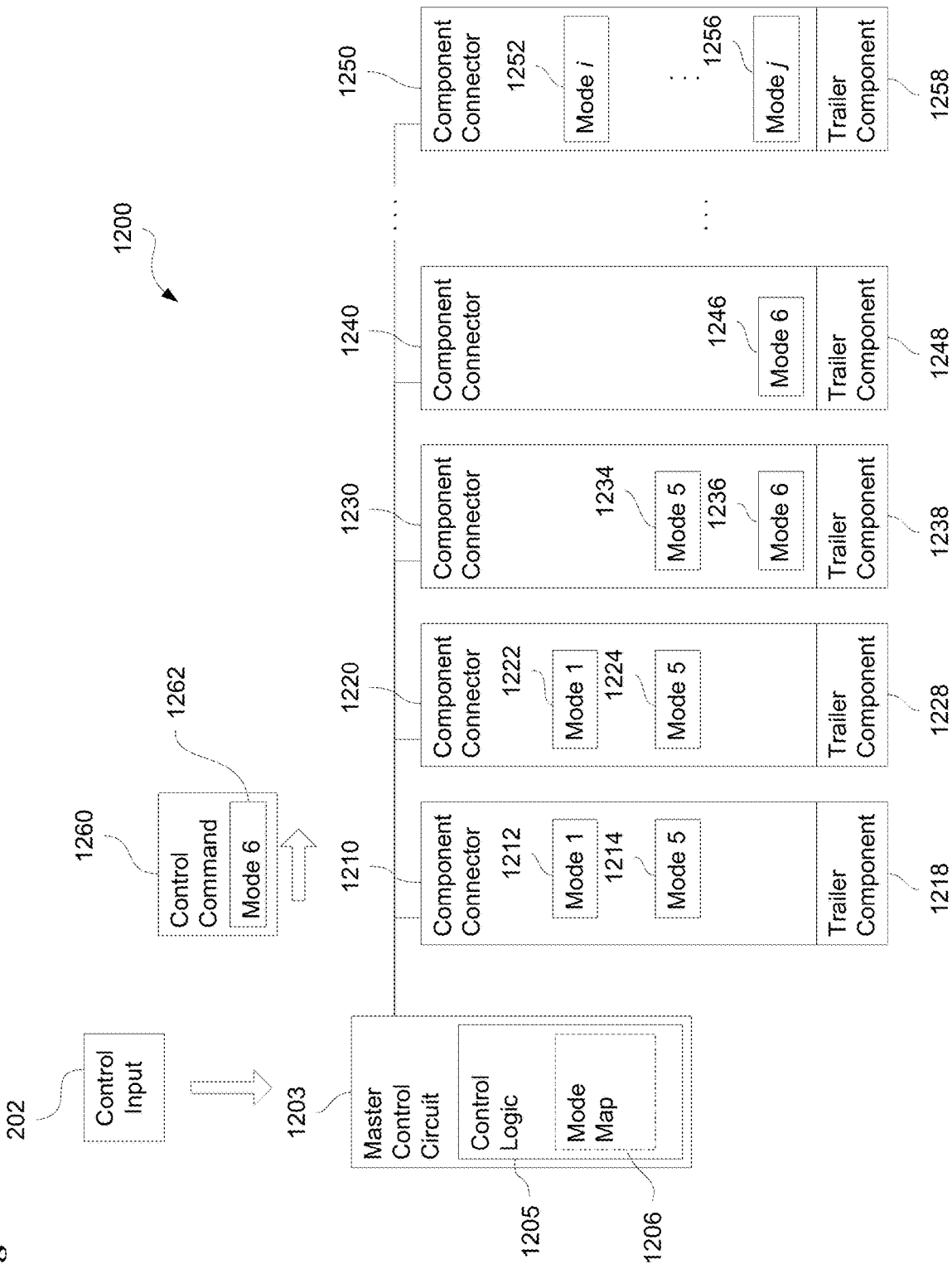
FIG. 12 is a component diagram illustrating another example of the system of preceding figures in operation.

FIG. 12 illustrates operational aspects of a cable system 1200 like those disclosed herein elsewhere. In FIG. 12, a master control circuit 1203 is configured to accept control input 202 and generate control commands 1260 for trailer components 1218, 1228, 1238, 1248, and 1258. The master control circuit 1203 may be configured to individually signal trailer components 1218-1258 to activate or deactivate one or more functions or features of these components. In another aspect, master control logic 1205 may be configured to activate trailer components based on one or more operating modes defining which trailer components 125 of cable system 1200 should respond to a given control input 202.

In one example, a control command 1260 is generated by master control circuit 1203 and configured to define one or more operating modes corresponding to control input 202. In another aspect, master control circuit 1203 may include master control logic 1205 configured to determine which modes correspond to control input 202. In another aspect, master control circuit 1203 may include a mode map 1206 specifying the relationships between control input 202 and modes such as command mode 1262. The master control circuit 1203 may use master control logic 1205 and mode map 1206 to process input from the truck 105 and generate one or more control commands 1260.

For example, trailer components 1218, 1228, 1238, 1248, and 1258 may include at least three side-facing lamps mounted on the side of trailer 111, the at least three side-facing lamps being mounted to three separate trailer component connectors 120 such as 1210, 1220, and 1230. In this example, master control circuit 1203 may be configured to accept a turn signal activation as control input 202 from the truck 105 and generate a control command 1260 with a corresponding command mode 1262. The master control circuit 1203 may send control command 1260 with command mode 1262 to some or all component connectors 1210, 1220, 1230, 1240, and 1250 in cable system 1200. Each trailer component connector 120 may then match command mode 1262 to the modes retained by each trailer component connector 120 such as modes 1212, 1214, 1222, 1224, 1234, 1236, and so on. When a mode stored in a trailer component connector 120 matches command mode 1262, trailer component connector 120 may either activate or deactivate the trailer components 125 accordingly.

In another aspect illustrated in FIG. 12, and individual trailer component connector 120 may be configured to react to multiple modes. For example, component connector 1210 is configured to respond to control commands specifying connector mode 1212 and 1214, and component connector 1230 is configured to respond to connector mode 1234 and 1236. Thus an upper side marker lamp of a trailer 111 could respond to a "left turn" mode as well as a "running lights" mode, or a rear identification lamp could operate in a "running lights" mode, as well as in a "braking" mode. As shown for component connector 1250, any suitable number of modes may be specified for a give trailer component connector 120.

Figure 13:
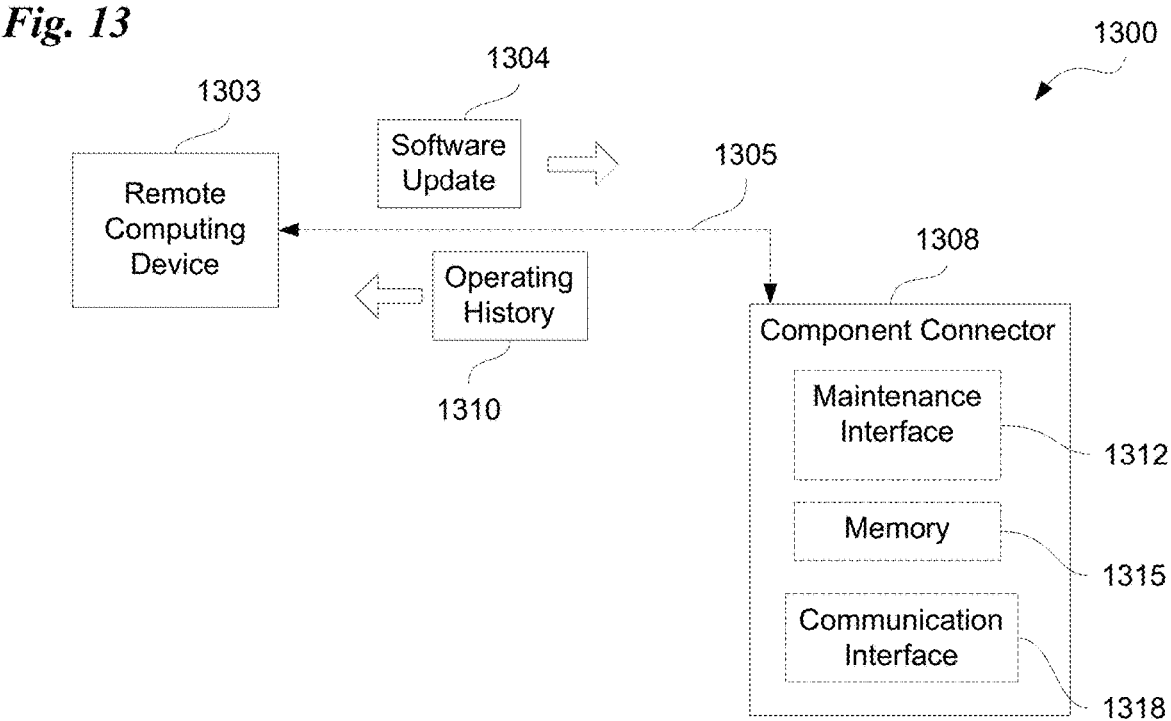
FIG. 13 is a component diagram illustrating maintenance aspects of a trailer component connector like those shown in the preceding figures.

FIG. 13 is a component diagram illustrating maintenance aspects of a component connector 1308 like the component connectors shown in the preceding figures. A remote computing device 1303 may be configured to provide software updates 1304 to component connector 1308, and to receive operating history 1310 from the component connector 1308. The component connector 1308 optionally includes a maintenance interface 1312 for managing maintenance aspects of component connector 1308, and a memory 1315 for storing software updates 1304 that may be applied to update control logic and other aspects of component connector 1308.

In another aspect, memory 1315 may also be used to maintain operational status information for component connector 1308. For example, status information may include dates, times, or other relevant information about recent activation and deactivation of trailer components coupled to component connector 1308. Operational status may optionally include data about control logic in component connector 1308 such as recent software updates 1304 that may have been applied, error codes, software failures, and/or diagnostic information that may be used for debugging purposes. Other operational status information may include failures of components or subcomponents of component connector 1308, problems with circuitry related to component connector 1308 such as short-circuits, open circuits, intermittent circuit failures, corrosion, and the like. In one aspect, component connector 1308 may include lamp outage detection circuitry for determining when one or more LEDs of a lamp have failed. This information may be stored in memory 1315 and sent to remote computing device 1303 so that trailer 111 may be flagged for maintenance.

The software update 1304 may be transferred to component connector 1308, and operating history 1310 may be transferred to remote computing device 1303 using a communication link 1305 that couples remote computing device 1303 to component connector 1308. The communication link 1305 may be implemented using any suitable communication method such as via a wireless link between remote computing device 1303 and component connector 1308. In another aspect, communication link 1305 may be implemented as a physical wired connection such as via a USB cable and the like.

In one example, remote computing device 1303 is a tablet computer configured to execute a maintenance application. The remote computing device 1303 may be configured by the maintenance application to establish communication link 1305 with one or more component connectors 1308 mounted to trailer 111. In this example, communication link 1305 is preferably a wireless communication link such as a Bluetooth or Wi-Fi connection between remote computing device 1303 and component connector 1308. The remote computing device 1303 may be configured to interact with maintenance interface 1312 to upload software updates 1304 as needed to keep the control logic and other operating parameters of component connector 1308 up-to-date. The remote computing device 1303 may also be configured to interact with maintenance interface 1312 to download operating history 1310 so that it can be analyzed to uncover bugs in the control logic, study the timing and other circumstances related to failures of components connected to component connector 1308, and/or notify a maintenance system that component connector 1308 of trailer 111 is due for inspection, cleaning, upgrades, or other maintenance.

Figure 14:
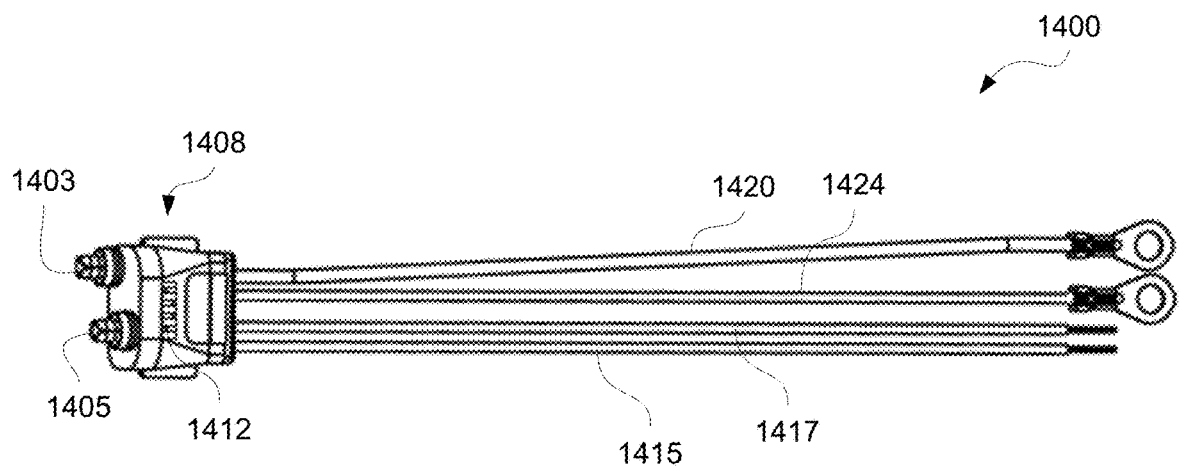
FIG. 14 is a component diagram illustrating components that may be included in a trailer component connector like the ones shown in the preceding figures.

FIG. 14 is a component diagram illustrating other physical aspects of a trailer component connector 1400 that may be included in a trailer component connector like the ones shown in the preceding figures. In one aspect, trailer component connector 1400 includes a power connection terminal 1403 and a ground connection terminal 1405, at least a portion of which are contained within a housing that includes unitary molded structure 1408. In another aspect, trailer component connector 1400 includes a slave control circuit like those disclosed herein elsewhere, and the slave control circuit is partially or fully contained within unitary molded structure 1408. As illustrated in FIG. 14, a portion of the control circuit switches 1412 project through unitary molded structure 1408 so that the control circuit may be physically manipulated to specify an address, operating mode, or other operational aspects of trailer component connector 1400. In another aspect, trailer 111 optionally includes multiple identical connectors 1400 electrically connecting all trailer components 125 to identical trailer component connectors 120. In this example, the identical connectors 120 provide the opportunity to use interchangeable connectors for any trailer components 120 thus reducing or eliminating the complexity of maintaining different types of connectors for different trailer components.

In another aspect, trailer component connector 1400 includes a housing enclosing one end of component power connection cable 1420, component ground connection cable 1424, communication cable 1415, and optional second communication cable 1417. In this example, at least the enclosing portion of the housing includes a unitary molded structure 1408. A power connection terminal 1403, and ground connection terminal 1405 may also extend away from the unitary molded structure 1408 to terminate within the housing and electrically connect to the slave control circuit enclosed therein. In this example, switch 1412 operate as a mode or address selector and extend outside the housing.

Looking at other implementation details, unitary molded structure 1408 may include or be formed from any suitable material such as a polymeric material. In another aspect, switch 1412 may include multiple dual position switches operating as a mode selector. In this example, the mode identifier for trailer component connector 1400 is defined by the positions of the switches. In another aspect, trailer component connector 1400 may include aspects discussed above with respect to component connector 1308 such as communication link supporting wireless access to maintenance aspects of trailer component connector 1400. In another aspect, trailer component connector 1400 may be configured to receive software updates for changing operational aspects such as mode identifiers, the address of trailer component connector 1400, and the like. trailer component connector 1400 may include a memory configured to store this information and may provide a wired or wireless communication link so that a remote computing device like remote computing device 1303 may be used to implement changes to operational aspects of trailer component connector 1400.

Figure 15:
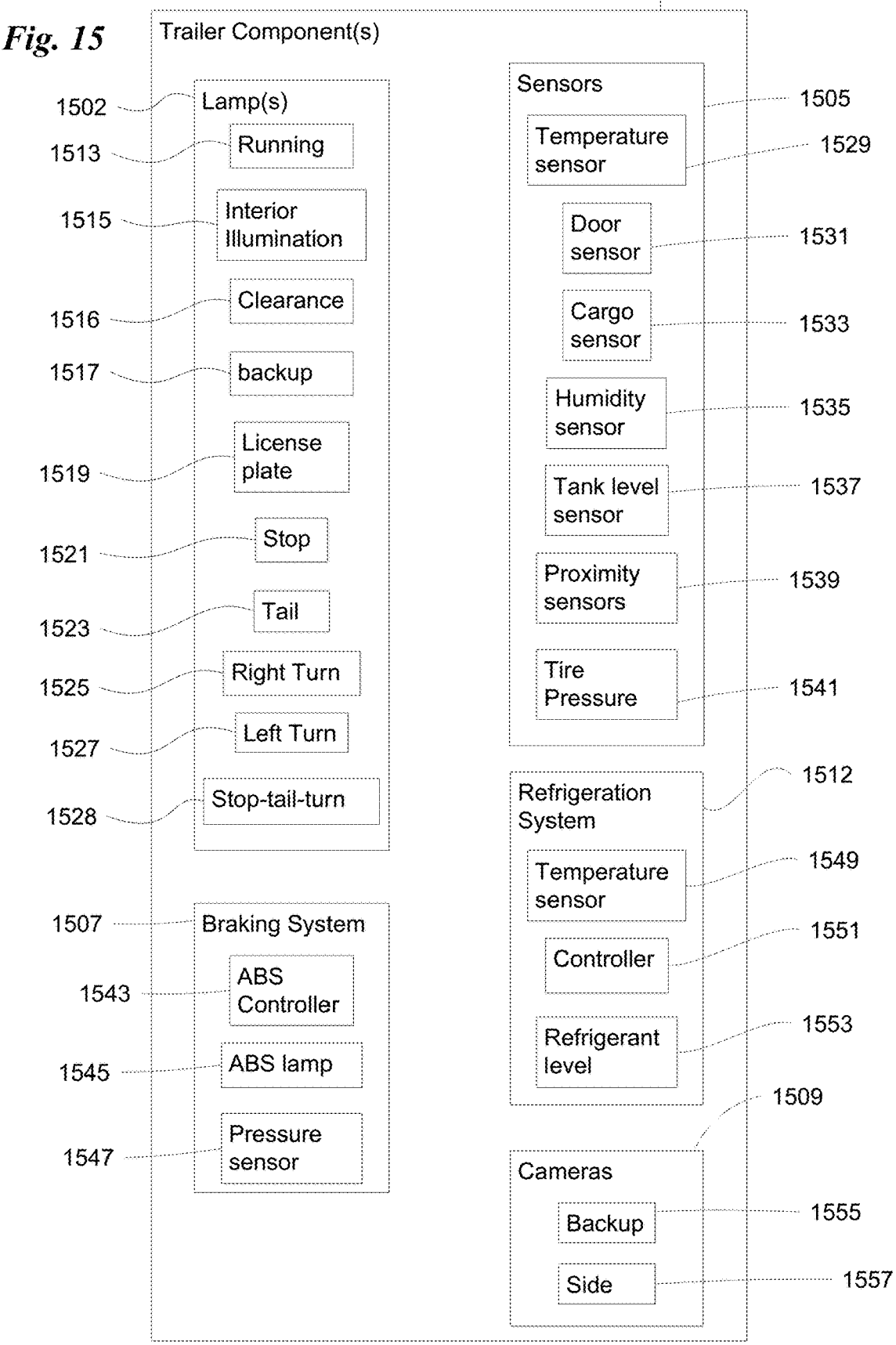
FIG. 15 is a component diagram illustrating trailer components that may be used with a cable system for a trailer like the one shown in FIG. 1.

Examples of trailer components 1500 that may be electrically connected to cable systems like those discussed herein elsewhere are shown in FIG. 15. The trailer components 125 shown in FIG. 15 are merely examples of components that might be included in a trailer 111, and should not be construed as an exhaustive list or as otherwise limiting the types of components envisioned. Other components may be included while some listed here may be excluded depending on the type of trailer and other factors.

The trailer components 1500 may include lamp(s) 1502, braking system 1507, sensors 1505, cameras 1509, and/or refrigeration system 1512. For example, lamp(s) 1502 may include, but are not limited to, running lamps 1513, interior illumination lamps 1515 for lighting the interior of the trailer, side marking/clearance/identification lamps 1516 for marking extremities of the trailer, backup lamps 1517 for illuminating the area behind the trailer, license plates 1519 for lighting the license plate area on the trailer, stop lamps 1521 that may illuminate when the vehicle is actively braking, tail lamps 1523, left turn lamps 1527 and right turn lamps 1525, and/or, stop-tail-turn 1528.

The sensors 1505 may include any of temperature sensor 1529 for sensing the temperature in and/or around trailer 111, door sensor 1531 configured to optionally sense when trailer doors are open or closed, cargo sensor 1533 configured to optionally sense weight, location, and/or other attributes of cargo in or on trailer 111, humidity sensor 1535 for optionally sensing absolute or relative humidity in and/or around trailer 103, tank level sensor 1537 optionally for sensing the level of fluids (liquids or gases) carried by trailer 111, proximity sensor 1539 optionally for sensing proximity of trailer 111 relative to nearby objects, and/or tire pressure 1541 optionally for sensing pressure levels in tires of trailer 111.

The braking system 1507 may optionally include an anti-lock Brakes (ABS) controller 1543 for controlling the ABS braking system, ABS lamp 1545 optionally for indicating the status or failure of the braking system 1507, and/or pressure sensor 1547 optionally included to sense changes in hydraulic or air pressure in braking system 1507. Other optional trailer components include cameras 1509 such as one or more backup cameras 1555 for optionally capturing a view of the surrounding area directly behind trailer 111, and one or more side cameras 1557 for optionally capturing a view of areas adjacent to the sides of trailer 111.

Components of refrigeration system 1512 may include temperature sensor 1549 for determining the temperature inside the refrigerated cargo area of the trailer, controller 1551 configured to control the refrigeration cycle in the refrigeration system, and refrigerant level 1553 for determining the level of refrigerant in refrigeration system 1512.

Figure 16:
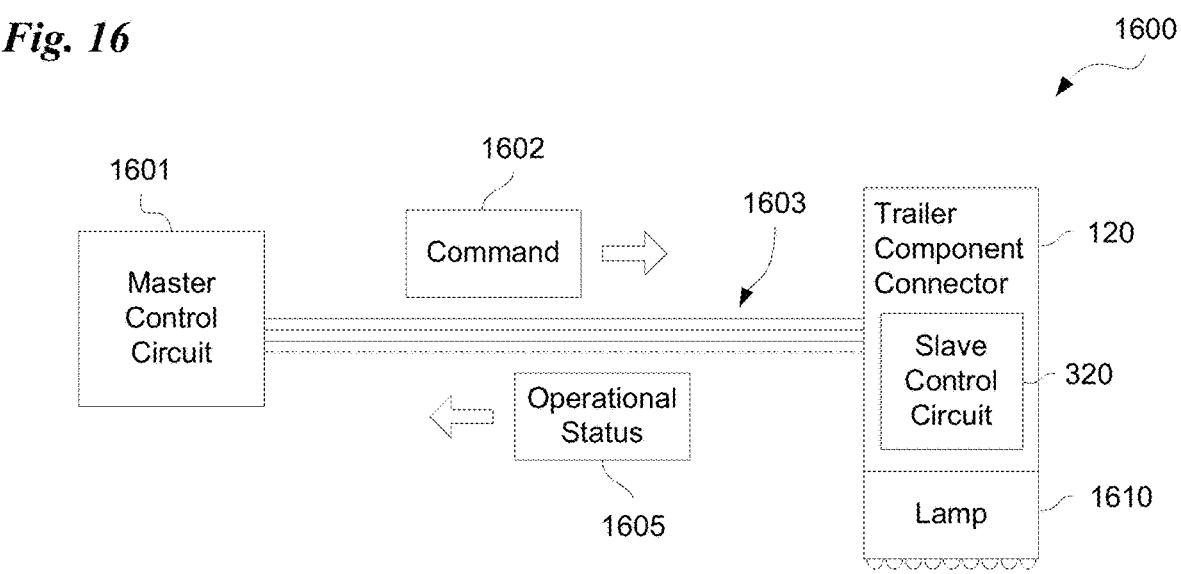
FIG. 16 is a component diagram illustrating operational aspects of a lamp that may be used with a cable system like the one shown in FIG. 1.

FIG. 16 illustrates operational aspects of a trailer lamp 1600 that may be relevant for a lamp mounted to trailer 111 using the disclosed cable system and trailer component connectors. In FIG. 16, master control circuit 1601 is coupled to trailer component connector 120 via cable system 1603. Multiple commands 1602 may be sent from master control circuit 1601 to trailer component connector 120 and processed by slave control circuit 320. A lamp 1610 coupled to trailer component connector 120 is thus configured to activate and deactivate as discussed throughout the current disclosure.

In another aspect, operational status 1605 information may be sent by trailer component connector 120 back to master control circuit 1601 using cable system 1603 thus providing master control circuit 1601 with historical information about lamp 1610. In another aspect, lamp 1610 includes one or more LEDs, and slave control circuit 320 may include an outage detection circuit configured to determine when one or more of the individual LEDs has failed. The slave control circuit 320 is configured to send data about the operational status 1605 to the master control circuit 1601 using cable system 1603 thus allowing two-way-communication between master control circuit 1601 and lamp 1610.

Figure 17:
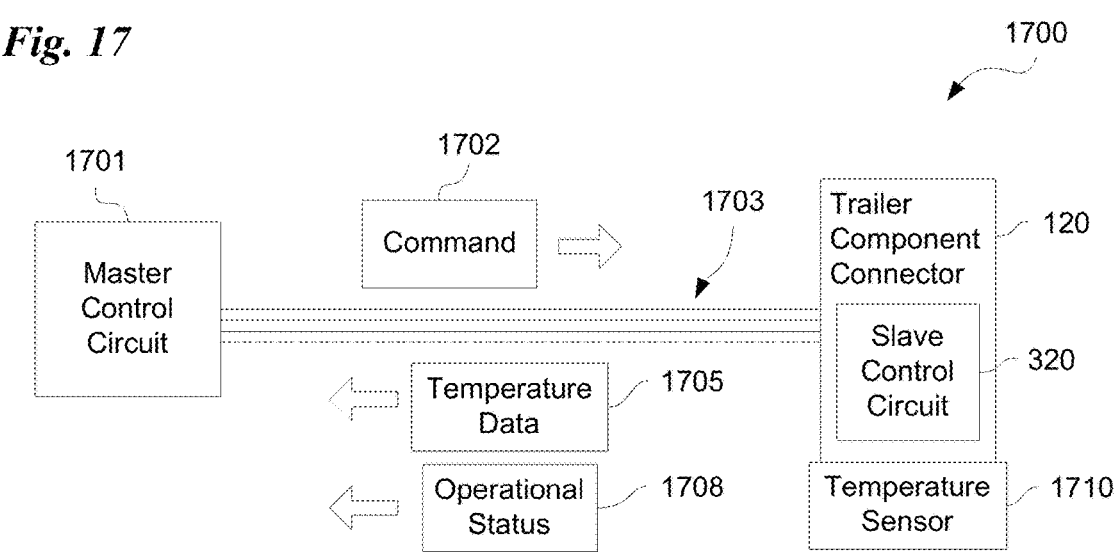
FIG. 17 is a component diagram illustrating operational aspects of a temperature sensor that may be used with a cable system like the one shown in FIG. 1.

FIG. 17 illustrates operational aspects of a temperature sensor 1700 that may be relevant for a temperature sensor mounted to trailer 111 using the disclosed cable system and trailer component connectors. In FIG. 17, master control circuit 1701 is coupled to trailer component connector 120 via cable system 1703. Multiple commands 1702 may be sent from master control circuit 1701 to trailer component connector 120 and processed by slave control circuit 320 as disclosed herein. A temperature sensor 1710 coupled to trailer component connector 120 is thus configured to activate and deactivate as discussed throughout the current disclosure.

In another aspect, temperature data 1705 may be sent by trailer component connector 120 back to master control circuit 1701 using cable system 1703. This allows temperature sensor 1710 to provide a stream of data representing the sensed input from temperature sensor 1710, which in this case is the temperature at the sensor. The slave control circuit 320 is configured to accept temperature data 1705 from the temperature sensor and to send the temperature data 1705 to master control circuit 1701 using the cable system 1703. Other types of sensors such as humidity, pressure, weight, and the like might operate similarly when coupled to trailer component connector 120 in this way. Components like temperature sensor 1710 may thus engage in two-way communication with master control circuit 1701 as they are activated and deactivated according to commands 1702, and in turn provide temperature data 1705 and operational status 1708 to master control circuit 1701.

In another aspect, slave control circuit 320 may include an outage detection circuit configured to determine an operational status 1708 of the temperature sensor 1710. The slave control circuit 320 may be configured to send data about the operational status 1708 to the master control circuit 1701 using cable system 1703.

Figure 18:
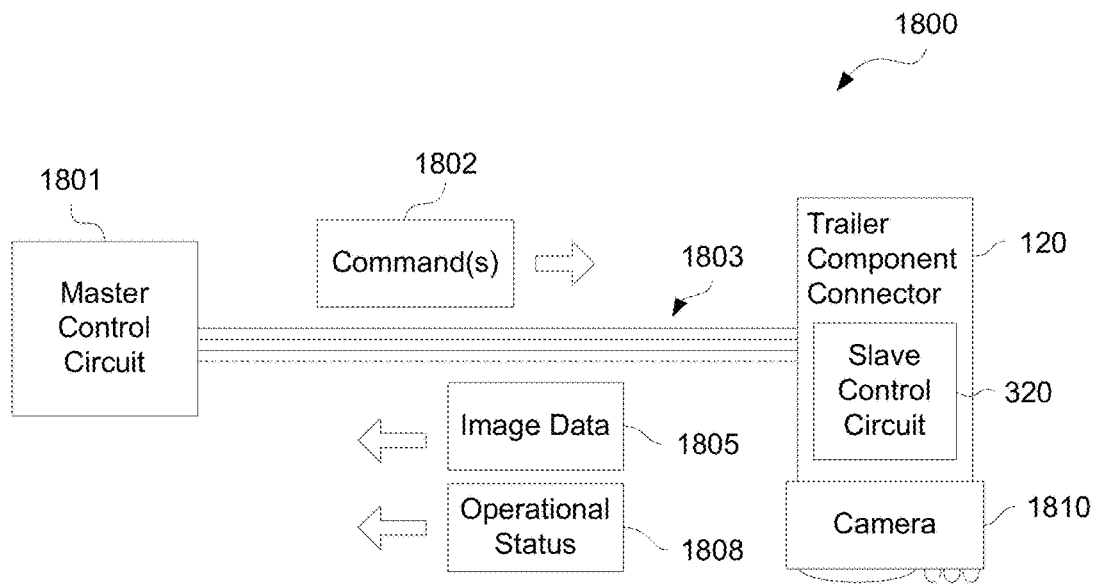
FIG. 18 is a component diagram illustrating operational aspects of a trailer mounted camera that may be used with a cable system like the one shown in FIG. 1.

FIG. 18 illustrates operational aspects of a trailer mounted camera 1800 that may be relevant for a camera mounted to trailer 111 using the disclosed cable system and trailer component connectors. In FIG. 18, master control circuit 1801 is coupled to trailer component connector 120 via cable system 1803. Multiple commands 1802 may be sent from master control circuit 1801 to trailer component connector 120 and processed by slave control circuit 320 as disclosed herein. A camera 1810 coupled to trailer component connector 120 is thus configured to activate and deactivate as discussed throughout the current disclosure.

In another aspect, image data 1805 may be sent by trailer component connector 120 back to master control circuit 1801 using cable system 1803. This allows camera 1810 to provide a stream of data representing image data 1805 captured by camera 1810. The slave control circuit 320 is configured to accept image data 1805 from the camera 1810 and to send the image data 1805 to master control circuit 1801 using the cable system 1803. In this way, components like camera 1810 may engage in two-way communication with master control circuit 1801 as they are activated and deactivated according to commands 1802, and in turn provide image data 1805 and operational status 1808 to master control circuit 1801.

In another aspect, slave control circuit 320 may be configured to send data about the operational status 1808 to the master control circuit 1801 using cable system 1803. This may include any relevant information about camera 1810 such as notifications of outages, circuit faults, or other failures in the connectors or cables. In another aspect, camera 1810 may send status information about the quality of the image captured, lighting or other conditions that affect the quality of the image, overall levels of visibility, detection of weather events such as fog, rain, or glare from sunlight, and the like.

Figure 19:
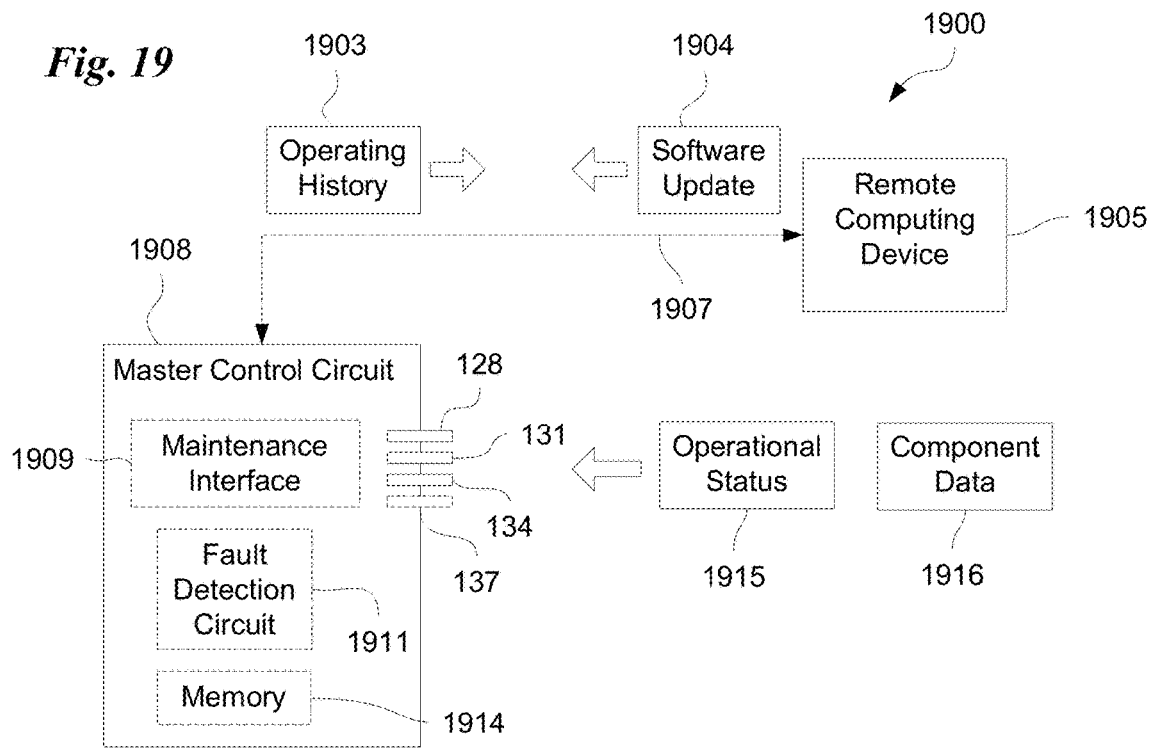
FIG. 19 is a component diagram illustrating maintenance aspects of a master control circuit like those shown in the preceding figures.

FIG. 19 is a component diagram illustrating master control circuit maintenance aspects 1900 of a master control circuit 1908 like those shown in the preceding figures and discussed herein elsewhere. A remote computing device 1905 may be configured to provide software updates 1904 to master control circuit 1908, and to receive operating history 1903 from master control circuit 1908 over time. The master control circuit 1908 optionally includes a maintenance interface 1909 for managing maintenance aspects of master control circuit 1908, and a memory 1914 for storing software updates 1904 that may be applied to update control logic and other aspects of master control circuit 1908.

Trailer components may also send data to master control circuit 1908. For example, operational status 1915 information about the status of attached trailer components may be sent by some or all of trailer components 125. Similarly, component data 1916 provided by some trailer components may also be sent to master control circuit 1908. This data may be provided by, for example, sensors, cameras, microphones, or other data collection devices built into trailer components 125 coupled to master control circuit 1908. Operational status 1915 and component data 1916 may be sent to master control circuit 1908 using communication cable 134 and optional additional communication cable 137, or any other suitable means of data transmission, and stored in memory 1914 for later processing and/or for transmission to remote computing device 1905.

In another aspect, memory 1914 may also be used to maintain operational status information for master control circuit 1908. For example, status information may include dates, times, or other relevant information about recent activation and deactivation of trailer components coupled to master control circuit 1908. Operational status may optionally include data about control logic in master control circuit 1908 such as recent software updates 1904 that may have been applied, error codes, software failures, and/or diagnostic information that may be used for debugging purposes. Other operational status information may include failures of trailer components 125 such as short-circuits, open circuits, intermittent component failures, corrosion in the wiring or contacts, and the like. In one aspect, master control circuit 1908 may include a fault detection circuit 1911 for determining when one or more trailer components 125 has experience intermittent or permanent outages or failures of either the trailer component 125 itself, or of certain functional aspects of the component. This information may be stored in memory 1914 and sent to remote computing device 1905 so that trailer 111 may be flagged for maintenance.

The software update 1904 may be transferred to master control circuit 1908, and operating history 1903 optionally containing relevant operational status 1915 and component data 1916 or other information about the operation of the cable system, may be transferred to remote computing device 1905 using a communication link 1907 that couples remote computing device 1905 to master control circuit 1908. The communication link 1907 may be implemented using any suitable communication method such as via a wireless link between remote computing device 1905 and master control circuit 1908 such as via Bluetooth or Wi-Fi connections. In another aspect, communication link 1907 may be implemented as a physical wired connection such as via a USB cable and the like.

In one example, remote computing device 1905 is a tablet computer configured to execute a maintenance application. In another example, remote computing device 1905 is a server computer that may be used to collect and process operating history 1903. The remote computing device 1905 may be configured to establish communication link 1907 with one or more master control circuits 1908 mounted to different trailers 111. In this example, communication link 1907 is preferably a wireless communication link such as a Bluetooth or Wi-Fi connection between remote computing device 1905 and master control circuit 1908. In another aspect, communication link 1907 may include a Bluetooth connection to a tablet computer located near trailer 111, a Wi-Fi connection between the tablet computer and a nearby network, and an optical fiber network connection connecting the nearby network with a remote server computer.

The remote computing device 1905 may be configured to interact with maintenance interface 1909 to download software updates 1904 as needed to keep the control logic and other operating parameters of master control circuit 1908 up-to-date. The remote computing device 1905 may also be configured to interact with maintenance interface 1909 to upload operating history 1903 so that it can be analyzed to uncover bugs in the control logic, study the timing and other circumstances of failures of components connected to master control circuit 1908. In another aspect, remote computing device 1905 and maintenance interface 1909 collaborate to uncover problems or potential failures in trailer components 125 or master control circuit 1908, or to notify maintenance personnel of schedule prevent preventative maintenance that is due.

FIGS. 20-26 illustrate three different examples of how trailer components 125 may be configured and arranged on different types of truck trailers, and examples of how trailer components 125 may be configured to operate when coupled to a cable system as disclosed herein. These illustrations are representative of the requirements for semi-trailers as indicated in the Federal Motor Vehicle Safety Standards (FMVSS) for lamps and reflective devices found in 49 CFR 393.11. Some trailers may include additional lighting or other trailer components. Thus FIGS. 20-25 are illustrative and are not be considered restrictive.

Figure 21:
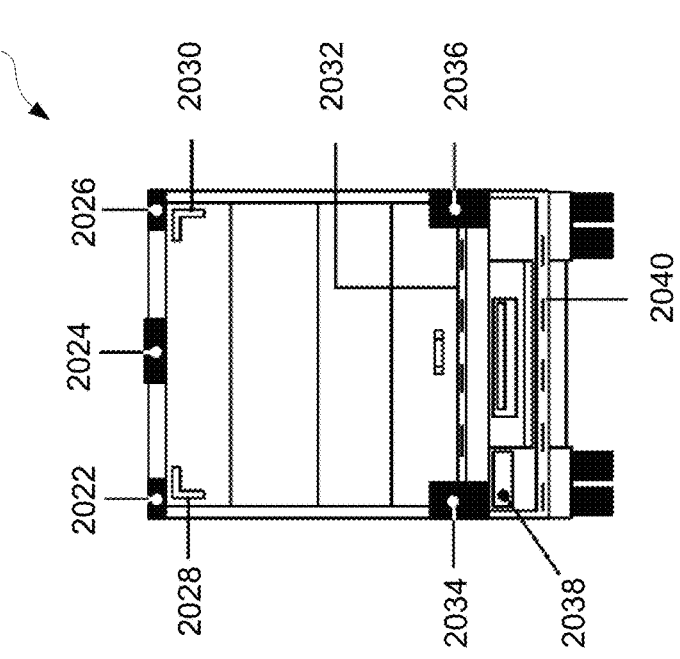
FIG. 21 is a rear view of the dry van or box type semi-trailer of FIG. 20.
Figure 20:
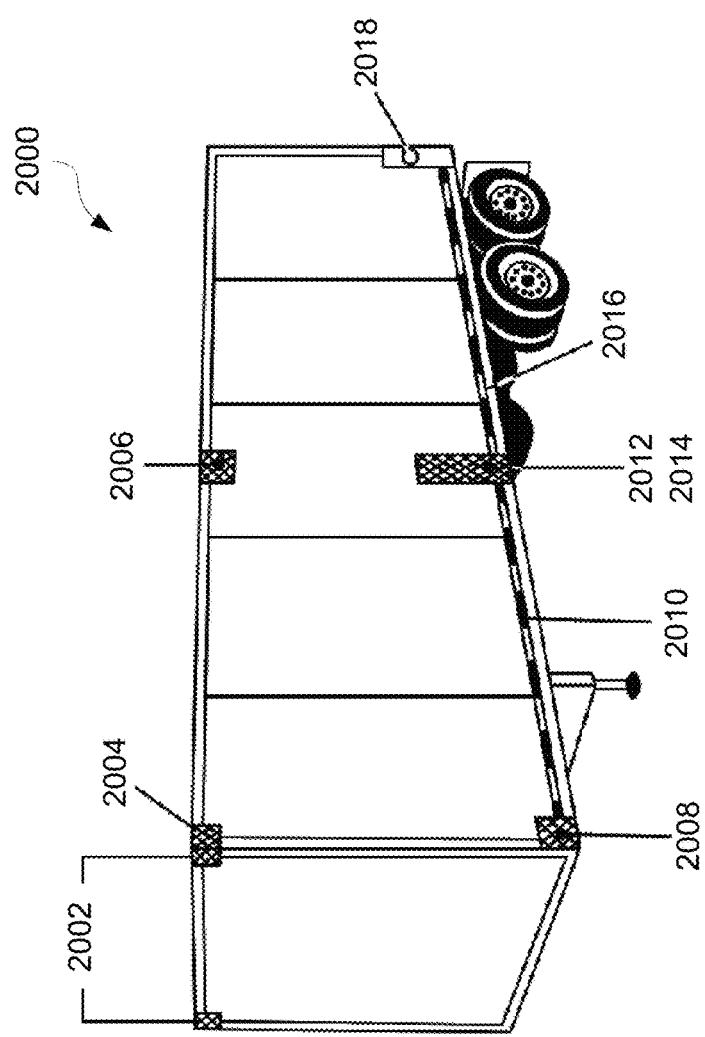
FIG. 20 is a perspective view of a dry van or box type semi-trailer that includes a cable system like the one shown in the preceding figures.

FIGS. 20 and 21 illustrate a dry van or box type semi-trailer 2000. Mounted along the top front and sides of this example of a box trailer are front clearance lamps 2002, upper front left side marker lamps 2004, and upper intermediate left side marker lamps 2006. Mounted along the lower sides are lower front left side marker lamps 2008, side marking 2010, intermediate side reflex reflectors 2012, lower intermediate side marker lamps 2014, side marking 2016, and left side rear marker lamps and reflex reflectors 2018. In FIG. 21, one or more left rear clearance lamps 2022, rear identification lamps 2024, right rear clearance lamps 2026, rear upper body marking 2028, and rear upper body marking 2030 are arranged along the top portion of the rear of the trailer. Along the bottom of the trailer are left rear stop turn tail lamps and reflex reflectors 2034, and right rear stop turn tail lamps and reflex reflectors 2036 arranged on opposite sides with rear lower body marking 2032 extending between, license plate lamp(s) 2038 provides lighting around the license plate area, and bumper bar marking 2040 provides markings near the bottom rear of the truck trailer.

Figure 23:
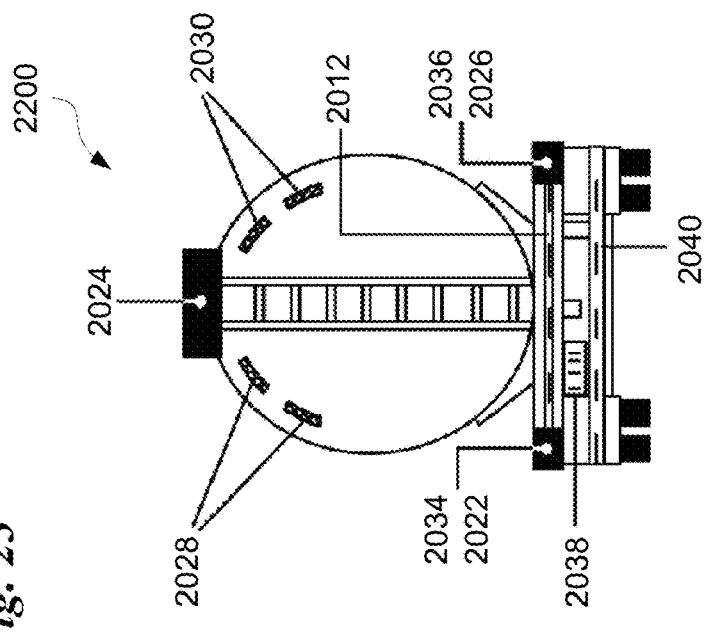
FIG. 23 is a rear view of the bulk liquid or tanker semi-trailer of FIG. 22.
Figure 22:
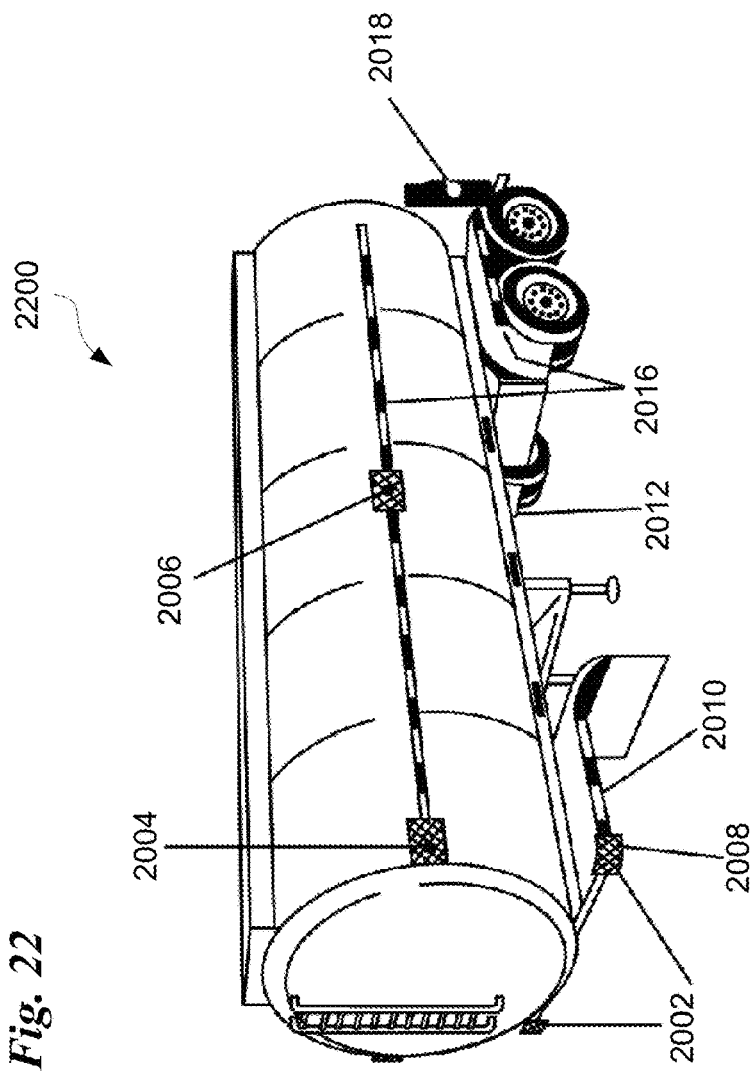
FIG. 22 is a perspective view of a bulk liquid or tanker semi-trailer that includes a cable system like the one shown in the preceding figures.

FIGS. 22 and 23 illustrate a bulk liquid or tanker semi-trailer 2200 that has upper front left side marker lamps 2004 and upper intermediate left side marker lamps 2006 mounted along the sides of the trailer about midway up the side of the bulk liquid container portion. Included along the lower front of the trailer are front clearance lamps 2002, lower front left side marker lamps 2008, side marking 2010, with intermediate side reflex reflectors 2012 and side marking 2016 mounted along the lower sides, and left side rear marker lamps and reflex reflectors 2018 mounted on the sides at the rear. One or more rear upper body marking 2028, rear identification lamps 2024, and rear upper body marking 2030 are arranged in a clockwise configuration going around the upper portion at the rear of the trailer. Rear upper body marking 2028, and rear upper body marking 2030 are arranged along the top portion of the rear of the trailer. Along the bottom of the trailer are 2034, and right rear stop turn tail lamps and reflex reflectors 2036 arranged on opposite sides with rear lower body marking 2032 extending between. One or more license plate lamp(s) 2038 provide lighting around the license plate area, and bumper bar marking 2040 provides markings near the bottom rear of the truck trailer.

Figure 25:
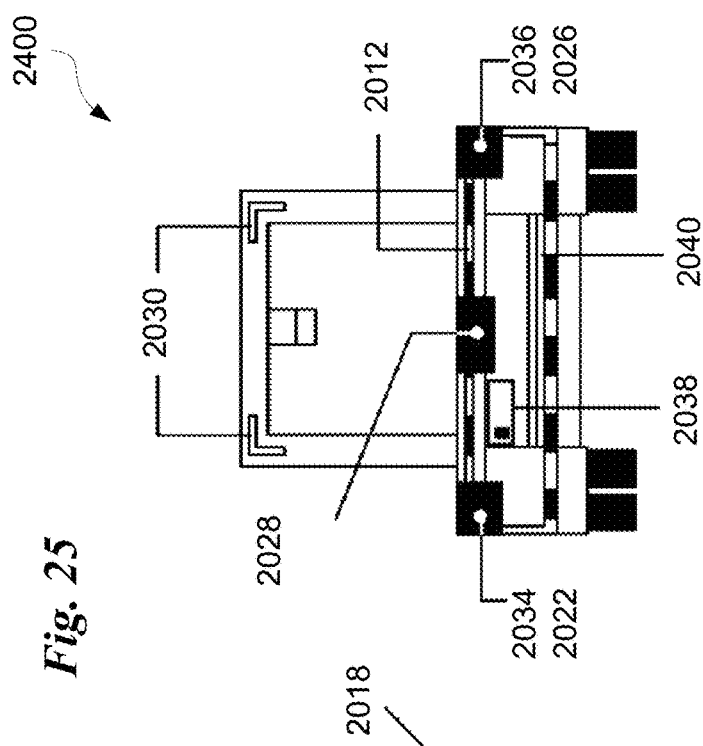
FIG. 25 is a rear view of the gooseneck flatbed semi-trailer of FIG. 24.
Figure 24:
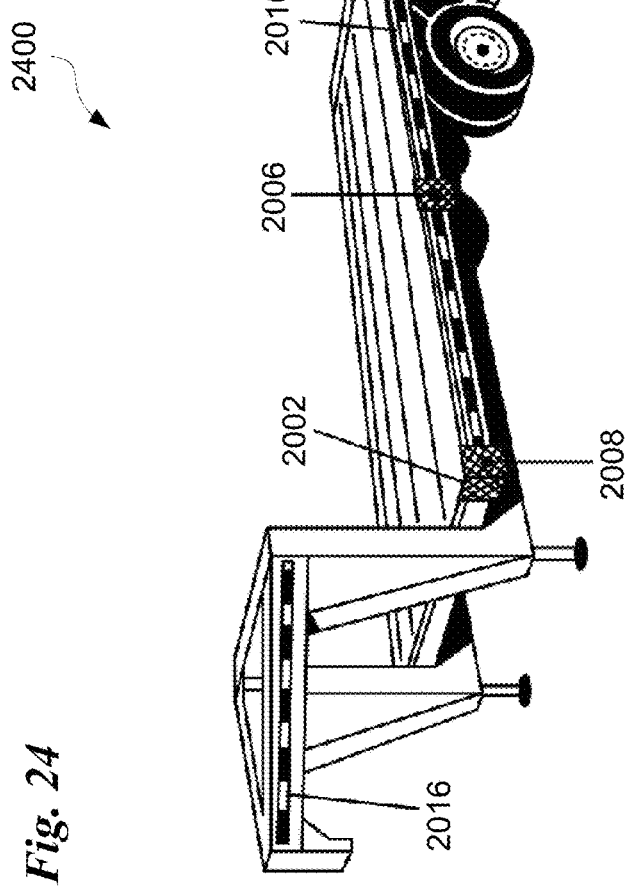
FIG. 24 is a perspective view of another example of a gooseneck flatbed semi-trailer that includes a cable system for a trailer like the one shown in the preceding figures.

FIGS. 24 and 25 illustrate a gooseneck flatbed semi-trailer 2400 that has side marking 2016 along the gooseneck portion of the trailer, and front clearance lamps 2002, upper intermediate left side marker lamps 2006, lower front left side marker lamps 2008, side marking 2016, and left side rear marker lamps and reflex reflectors 2018 along the sides of the flatbed portion. One or more rear upper body markings 2030 are arranged on the rear of the gooseneck portion while left rear stop turn tail lamps and reflex reflectors 2034, left rear clearance lamps 2022, rear upper body marking 2028, intermediate side reflex reflectors 2012, right rear stop turn tail lamps and reflex reflectors 2036, and right rear clearance lamps 2026 are mounted along the rear of the flatbed portion of the trailer. Other aspects include license plate lamp(s) 2038 for illuminating the license plate area, and 2042 marked the lower extremity of the rear bumper bar.

FIG. 26 offers several examples of the disclosed cable system for a trailer 100 in operation according to the present disclosure. In the examples of FIG. 26, the trailer components are lamps located around the trailer and the locations are discussed with reference to the locations noted in the preceding FIGS. 20-25. Each row in the table of FIG. 26 denotes a separate operating mode based on operator input, and each column represents an individual trailer component. An "F" denotes a lamp activated in a flashing mode. An "O" denotes a lamp that is activated and is steady on (i.e. Not flashing). Empty spaces indicate a lamp that is deactivated. Although these few examples speak of lamps, other trailer components may also be activated and deactivated according to different operating modes.

FIG. 26 illustrates several common activation schemes for comparison, one of which is presented at 2605. A left turn operating mode is often initiated when the driver actuates a turn signal. As shown at 2605, this generally results in flashing lower intermediate side marker lamps 2014, and the activation of the turn signal lamps at 2034.

2610 offers another possible outcome based on the system of the present disclosure. In this example, lower intermediate side marker lamps 2014, left rear clearance lamps 2022, and left rear stop turn tail lamps at 2034 are configured to activate when in the left turn operating mode, thus providing additional notification to surrounding vehicles by illuminating more lamps than the more common configuration shown at 2605.

In another left turn example at 2615, upper front left side marker lamps 2004, upper intermediate left side marker lamps 2006, lower front left side marker lamps 2008, lower intermediate side marker lamps 2014, left rear clearance lamps 2022, and both the stop and turn signal lamps at 2034 are all activated in a flashing mode thus providing increased warning that the truck trailer is about to turn left.

In another aspect, the disclosed system may be configured to use different or additional lighting in the braking mode. At 2620, the conventional activation scheme using hardwired circuits to specific lamps is included for reference. In a braking mode, brake lamps at 2034 and 2036 are activated. 2625 illustrates one example of the disclosed system operating in a braking mode where left rear clearance lamps 2022, rear identification lamps 2024, right rear clearance lamps 2026, as well as turn lamps at 2034 and 2036 are activated in a "steady on" mode to provide additional warning that the trailer is stopping.

Combinations of braking and turning are illustrated at 2630, 2635, and 2640. In the more common implementation, the lower intermediate side marker lamps 2014 and turn lamps at 2034 are activated to flash, while the stop lamps at 2034 and 2036 are activated to be steady on. The disclosed system operates at 2635 by activating lower intermediate side marker lamps 2014 to flash along with the turn lamps at 2034, while activating the left rear clearance lamps 2022, rear identification lamps 2024, right rear clearance lamps 2026, and the stop lamps at 2034 and 2036 to remain steady on. This example also provides additional warning for both the braking and the turn signal functions by selectively activating additional lamps.

In another aspect shown at 2640, upper front left side marker lamps 2004, upper intermediate left side marker lamps 2006, lower front left side marker lamps 2008, lower intermediate side marker lamps 2014, left rear clearance lamps 2022, and the turn lamps at 2034 are activated in the flashing mode, while the rear identification lamps 2024, right rear clearance lamps 2026, and the stop lamps at 2034 and 2036 are activated steady on to thus taking full advantage of left-side lamps, and rear facing lamps to provide additional warning of the left turn and stop actions taking place.

Other examples of the disclosed concepts include the following set of numbered examples:

EXAMPLE 1

A cable system for a trailer, comprising:
a power cable, a ground cable, and at least one communication cable mounted to the trailer;
a nosebox mounted to the trailer, the nosebox having:
  a) multiple terminals corresponding to trailer connection terminals of a truck tractor, the seven connection terminals including a ground cable a power cable; and
  b) a master control circuit mounted in the nosebox, the master control circuit electrically connected to the seven connection terminals, the power cable, ground cable, and the at least one communication cable, wherein the master control circuit is configured to accept control input from the truck tractor via the six separate power cable connections and to generate component control commands for controlling one or more individual trailer components mounted to the trailer, and wherein the master control circuit is configured to send the control commands to the trailer components via the at least one communication cable;

EXAMPLE 2

The cable system of any preceding example, comprising multiple trailer component connectors, each having:
  a) a power connection terminal for electrically connecting one of the individual trailer components to the power cable;
  b) a ground connection terminal for electrically connecting one of the individual trailer components to the power cable; and
  c) a slave control circuit electrically connected to the power cable, ground cable, and the at least one communication cable and configured to receive the control commands sent by the master control circuit and to selectively control one of the individual trailer components according to the control commands.

EXAMPLE 3

The cable system of any preceding example, wherein the master control circuit includes:
a master microcontroller; and
a master transceiver electrically connected to the master microcontroller and to the at least one communication cable.

EXAMPLE 4

The cable system of any preceding example, wherein the slave control circuit includes:
a slave microcontroller; and
a slave transceiver electrically connected to the slave microcontroller and to the at least one communication cable;
wherein the slave microcontroller receives the control commands sent by the master transceiver using the slave transceiver.

EXAMPLE 5

The cable system of any preceding example, comprising two communication cables to electrically connected to the master control circuit, wherein the master control circuit includes a Control Area Network (CAN) controller electrically connected to the communication cables, and/or wherein the slave control circuit includes a slave CAN controller, and wherein the master and slave control circuits communicate using a CAN protocol.

EXAMPLE 6

The cable system of any preceding example, comprising one communication cable electrically connected to the master control circuit, wherein the master control circuit includes a Local Interconnect Network (LIN) controller electrically connected to the communication cable, and/or wherein the slave control circuit includes a slave LIN controller, and wherein the master and slave control circuits communicate using a LIN protocol.

EXAMPLE 7

The cable system of any preceding example, wherein the slave control circuits define a mode identifier, and wherein the control commands sent by the master control circuit include a target mode identifier specifying the trailer component the control command is intended for, and wherein the slave control circuits are configured to:
compare the target mode identifier in the control commands received from the master control circuit with the mode identifier of the slave control circuit; and
electrically connect the individual trailer component to the power cable when the target mode identifier matches the mode identifier of the slave control circuit.

EXAMPLE 8

The cable system of any preceding example, wherein the one or more trailer components includes at least five rear-facing lamps mounted at the rear of the trailer, the at least five rear-facing lamps mounted in five separate trailer component connectors having separate addresses, and wherein the master control circuit is configured to:
accept brake input from the truck tractor; and
send control commands with target addresses associated with the at least five rear-facing lamps.

EXAMPLE 9

The cable system of any preceding example, wherein the slave control circuits of the multiple trailer component connectors include multiple dual position switches for defining the mode identifier of the slave control circuits.

EXAMPLE 10

The cable system of any preceding example, wherein the master control circuit includes control logic configured to process input from the truck tractor and generate one or more control commands specific to one or more of the individual trailer components.

EXAMPLE 11

The cable system of any preceding example, wherein the master control circuit includes a maintenance interface configured to receive the control logic from a remote device.

EXAMPLE 12

The cable system of any preceding example, wherein the individual trailer components include vehicle stop-tail-turn lamps, vehicle turn signal lamps, vehicle brake lamps, vehicle tail lamps, vehicle running lamps, vehicle anti-lock brakes, vehicle interior illumination lamps, vehicle reverse lamps, or any combination thereof.

EXAMPLE 13

The cable system of any preceding example, wherein the individual trailer components include an antilock brake system controller, pressure sensors, temperature sensors, door sensors, cargo sensors, cargo length sensors, liquid level sensors, refrigeration sensors, or any combination thereof.

EXAMPLE 14

The cable system of any preceding example, wherein the power connection terminal, the ground connection terminal, and the slave control circuit are partially or fully contained within a unitary molded structure.

EXAMPLE 15

The cable system of any preceding example, wherein one of the individual trailer components is a lamp having one or more LEDs, and the slave control circuit includes an outage detection circuit configured to determine an operational status of the one or more LEDs, and wherein the slave control circuit is configured to send data about the operational status to the master control circuit using the at least one communication cable.

EXAMPLE 16

The cable system of any preceding example, wherein one of the individual trailer components is a temperature sensor, and the slave control circuit is configured to accept temperature data from the temperature sensor and to send the temperature data to the master control circuit using the at least one communication cable.

EXAMPLE 17

The cable system of any preceding example, wherein one of the individual trailer components is a backup camera, and the slave control circuit is configured to accept image data from the backup camera and to send the image data to the master control circuit using the at least one communication cable.

EXAMPLE 18

The cable system of any preceding example, wherein the multiple terminals corresponding to trailer connection terminals of a truck tractor include seven connection terminals comprising a ground cable and six separate power cables.

EXAMPLE 19

A connector for trailer components in a truck trailer, comprising:
a main power connection, a ground connection, and at least one communication cable connection; and
a component power connection for electrically connecting an individual trailer component to power;
a component ground connection for electrically connecting the individual trailer component to ground;
a slave control circuit electrically connected to the component power connection, the component ground connection, the main power connection, the ground connection, and the at least one communication cable connection, wherein the slave control circuit is configured to:
a) receive a control command sent by a master control circuit using the at least one communication cable connection, wherein the control commands include a mode identifier; and
b) electrically connect the component power connection to the main power connection to provide power to the individual trailer component when the mode identifier in the control command matches a component mode identifier stored in the slave control circuit; and
a mode selector configured to accept input defining the component mode identifier.

EXAMPLE 20

The connector of example 19, having a housing, wherein one end of the main power connection, ground connection, at least one communication cable connection, component power connection and component ground connection terminates within the housing, wherein the slave control circuit is enclosed within the housing, and wherein a portion of the mode selector extends outside the housing.

EXAMPLE 21

The connector of any one of examples 19-20, wherein the housing is unitary molded structure formed from polymeric material.

EXAMPLE 22

The connector of any one of examples 19-21, wherein the mode selector includes multiple dual position switches, and wherein the mode identifier is defined by the positions of the switches.

EXAMPLE 23

The connector of any one of examples 19-22, comprising:
a maintenance interface configured to receive the component mode identifier from a remote device; and
a memory configured to store the component mode identifier.

EXAMPLE 24

The connector of any one of examples 19-23, wherein the main power connection, ground connection, and at least one communication cable connection are electrically connected to a master control circuit mounted in a trailer nosebox of the trailer, wherein the master control circuit is configured to accept control input from a truck tractor, and wherein the master control circuit is configured to generate different component control commands specific to one or more individual trailer components based on the control input.

EXAMPLE 25

The connector of any one of examples 19-24, wherein the trailer nosebox includes:
seven connection terminals corresponding to trailer connection terminals of a truck tractor, the seven connection terminals including a ground cable connection and six separate power cable connections.

EXAMPLE 26

The connector of any one of examples 19-25, wherein the individual trailer component is a lamp having one or more LEDs, and the slave control circuit includes an outage detection circuit configured to determine an operational status of the one or more LEDs, and wherein the slave control circuit is configured to send data about the operational status to the master control circuit using the at least one communication cable.

EXAMPLE 27

The connector of any one of examples 19-26, wherein the individual trailer component is a temperature sensor, and the slave control circuit is configured to accept temperature data from the temperature sensor and to send the temperature data to the master control circuit using the at least one communication cable.

EXAMPLE 28

The connector of any one of examples 19-27, wherein the individual trailer component is a backup camera, and the slave control circuit is configured to accept image data from the backup camera and to send the image data to the master control circuit using the at least one communication cable.

GLOSSARY OF DEFINITIONS AND ALTERNATIVES

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Activate" generally is synonymous with "providing power to", or refers to "enabling a specific function" of a circuit or electronic device that already has power.

"Address" generally refers to a label useful for identifying a location or thing. Examples include a specific region of memory in a computer from which data can be retrieved, or to which data can be stored. In the context of computer networks, an Internet Protocol address is a series of numbers used to uniquely identify a host on a network so that other computers connected to the network may direct data packets to a particular host. Similarly, in a Control Area Network (CAN) in a vehicle, addresses are used to direct the movement of data to individual nodes on the network.

"Anti-lock Braking System" generally refers to a vehicle safety system that allows the wheels on a motor vehicle (including trailers) to maintain tractive contact with the road surface according to driver inputs while braking, preventing the wheels from locking up (ceasing rotation) and avoiding uncontrolled skidding. ABS systems automatically apply the principles of threshold braking and cadence braking albeit a much faster rate and with better control than drivers can typically manage manually. ABS systems include wheel speed sensors to detect reduced wheel rotation indicative of impending wheel lock. An ABS controller is also included that can automatically actuate the braking system to reduce braking force on the affected wheel or wheels, and to quickly reapply braking force when the danger of wheel lock is reduced. This overall feedback loop may be executed multiple times a second resulting in rapid activation and deactivation of braking force or "pulsing" of the brakes.

Maximum braking force is obtained with approximately 10-20% slippage between the braked wheel's rotational speed and the road surface. Beyond this point, rolling grip diminishes rapidly and sliding friction provides a greater proportion of the force that slows the vehicle. Due to local heating and melting of the tires, the sliding friction can be very low. When braking at, or beyond, the peak braking force, steering input is largely ineffective since the grip of the tire is entirely consumed in braking the vehicle.

Threshold braking seeks to obtain peak friction by maintaining the maximum braking force possible without allowing wheels to slip excessively. Braking beyond the slipping point causes tires to slide and the frictional adhesion between the tire and driving surface is thus reduced. The aim of threshold braking is to keep the amount of tire slip at the optimal amount, the value that produces the maximum frictional, and thus braking force. When wheels are slipping significantly (kinetic friction), the amount of friction available for braking is typically substantially less than when the wheels are not slipping (static friction), thereby reducing the braking force. Peak friction occurs between the static and dynamic endpoints, and this is the point that threshold braking tries to maintain.

"Cadence" braking or "stutter" braking involves pumping the brake pedal and is used to allow a car to both steer and brake on a slippery surface. ABS systems generally provide this behavior automatically and at a much higher rate than most drivers can manually produce. It is used to effect an emergency stop where traction is limited to reduce the effect of skidding from road wheels locking up under braking. This can be a particular problem when different tires have different traction, such as on patchy ice for example. Cadence braking maximizes the time for the driver to steer around the obstacle ahead, as it allows the driver to steer while slowing.

ABS generally offers improved vehicle control and decreases stopping distances on dry and slippery surfaces; however, on loose gravel or snow-covered surfaces, ABS can significantly increase braking distance, although still improving vehicle steering control.

"Backup Camera" generally refers to a rear facing camera mounted to a vehicle or trailer for the purpose of capturing images of the area directly behind the vehicle.

"Brake Lamp" or "Stop Lamp" generally refers to a lamp mounted at or near the rear of a vehicle or trailer that is configured to illuminate when the vehicle or trailer brakes are applied so as to warn others that the vehicle is slowing. Brake lamps are commonly mounted at the rear of the vehicle or trailer and are generally configured to emit red light. As used herein, the term generally refers to a stop lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108

"Brake Mode" generally refers to a specific vehicle mode that is activated when the vehicle is slowed by an application of the braking system. This mode may be activated only briefly e.g. tapping the brakes or it may be activated and held for any amount of time e.g. sitting in stopped traffic.

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used.

A cable may include a sheath or layer surrounding the cable with electrically non-conductive material to electrically insulate the cable from inadvertently electrically connecting with other conductive material adjacent the cable.

A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Cable System" generally refers to one or more cables configured to operate together to achieve a result. For example, a cable system includes multiple cables or conductors operating together to carry electromagnetic energy. Examples of this include twisted pair network cables for carrying data over a network, coaxial cable carrying radio signals from a transmitter to an antenna, multiple wires carrying power to different parts of a vehicle such as a truck or a trailer, or three-wire AC wiring such as what is commonly found in homes for the purpose of carrying power. Cable systems may also be used to achieve a result in a mechanical context, such as in the case of a cable-stayed bridge where one or more cables are used to support a bridge, or in the case of a crane that may use one or more cables to lift and/or move a load.

"Cargo Sensor" generally refers to sensors configured to determine whether at least a portion of a trailer is loaded or unloaded. Any suitable sensing technology may be used for this purpose. Examples include cargo sensors that use ultrasonic detection, optical image analysis of the cargo area, or laser time-of-flight measurements for detecting the presence of cargo within a cargo area.

"Computer" or "Computing Device" generally refers to a device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the interne. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Communications cable" generally refers to a cable configured to carry digital or analog signals.

"Communication Link" generally refers to a connection between two or more communicating entities and may or may not include a communications channel between the communicating entities. The communication between the communicating entities may occur by any suitable means. For example, the connection may be implemented as a physical link, an electrical link, an electromagnetic link, a logical link, or any other suitable linkage facilitating communication.

In the case of a physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Comparison Logic" generally refers to software or electronic circuits configured to compare two or more values and determine a result based on one or more rules. The rules may be encoded as software executed on a processor in a computer, or encoded by an arrangement of digital or analog logic gates or circuits. Examples include if-then decision trees, comparisons made based on the relationships between sets of values, decision logic implemented in a neural network, fuzzy logic for determine partial truth results, and the like.

"Control Area Network (CAN)" or "CAN bus" generally refers to a communication system and network protocol that may be used for intercommunication between components or subsystems of a vehicle. A CAN (sometimes referred to colloquially as a "CAN bus") allows one or more microcontrollers or CAN enabled devices to communicate with each other in real time without a host computer. A CAN may physically connect all nodes together through a two wire bus. The wires may be a twisted pair cable with a 120 ohm characteristic impedance. These wires may be thought of as "high" and "low" connections.

CAN may be thought of as an example of a multi-master serial bus for connecting Electronic Control Units (ECUs) also referred to as "nodes". Two or more nodes are required on the CAN network to communicate. The complexity of the node can range from a simple I/O device such as a sensor, an active device such as a lamp, transmission, or brake actuator, or an embedded computer or ECU with a CAN interface. A node may also be a gateway allowing a standard computer to communicate over a network connection such as a Universal Serial Bus (USB) or Ethernet port allowing outside devices to be selectively added or removed from the CAN network.

A CAN bus does not require any addressing schemes, as the nodes of the network use unique identifiers that may be provided by programming the individual node before use, or reprogramming between uses. This provides the nodes with information regarding the priority and the urgency of transmitted message.

Each node may include a central processing unit, microprocessor, or host processor. The host processor may be configured to determine what the received messages mean and what messages to transmit in response. A node may be electrically connect to sensors, actuators, lamps, or other electronic devices that can be connected to the host processor. A node may also include a CAN controller, optionally integrated into the microcontroller. The can control may implement the sending and receiving protocols. When receiving, the CAN controller may store the received serial bits from the bus until an entire message is available, which can then be fetched by the host processor (for example, by the CAN controller triggering an interrupt). When sending, the host processor may send the transmit message(s) to the CAN controller, which transmits the bits serially onto the bus when the bus is free. A node may also include a transceiver. When receiving: the transceiver may convert the data stream from CAN bus levels to levels that the CAN controller uses. It may have protective circuitry to protect the CAN controller. When transmitting, the transceiver may convert the data stream from the CAN controller to CAN bus levels.

Each node may be configured to send and receive messages, but not simultaneously. A message or Frame consists primarily of the ID (identifier), which represents the priority of the message, and up to eight data bytes. A CRC, acknowledge slot (ACK) and other overhead are also part of the message. The improved CAN FD extends the length of the data section to up to 64 bytes per frame. The message is transmitted serially onto the bus using a non-return-to-zero (NRZ) format and may be received by all nodes.

CAN data transmission may use a lossless bitwise arbitration method of contention resolution. This arbitration method may require all nodes on the CAN network to be synchronized to sample every bit on the CAN network at the same time. Thus data may be transmitted without a clock signal in an asynchronous format.

The CAN specifications may use the terms "dominant" bits and "recessive" bits where dominant is a logical 0 (actively driven to a voltage by the transmitter) and recessive is a logical 1 (passively returned to a voltage by a resistor). The idle state may be represented by the recessive level (logical 1). If one node transmits a dominant bit and another node transmits a recessive bit then a collision results and the dominant bit "wins". This means there is no delay to the higher-priority message, and the node transmitting the lower priority message automatically attempts to retransmit, for example, six bit clocks after the end of the dominant message.

All nodes on the CAN network generally operate at the same nominal bit rate, but noise, phase shifts, oscillator tolerance and oscillator drift mean that the actual bit rate may not be the same as the nominal bit rate. Since a separate clock signal is not used, a means of synchronizing the nodes is used. Synchronization is helpful during arbitration since the nodes in arbitration may see both their transmitted data and the other nodes' transmitted data at the same time. Synchronization is also helpful to ensure that variations in oscillator timing between nodes do not cause errors.

Synchronization may start with a hard synchronization on the first recessive to dominant transition after a period of bus idle (the start bit). Resynchronization may occur on every recessive to dominant transition during the frame. The CAN controller may expect the transition to occur at a multiple of the nominal bit time. If the transition does not occur at the exact time the controller expects it, the controller adjusts the nominal bit time accordingly.

Examples of lower-layer (e.g. levels 1 and 2 of the ISO/OSI model), are commercially available from the International Standardization Organization (ISO) and include ISO 11898-1 through 11898-6, as well as ISO 16845-1 and 16845-2.

CAN standards may not include application layer protocols, such as flow control, device addressing, and transportation of data blocks larger than one message, as well as, application data. Other CAN standards are available that are optimized for specific fields of use. These include, but are not limited to:

ARINC 812 or ARINC 825 (for the aviation industry)
CANopen-EN 50325-4 (used for industrial automation)
DeviceNet (used for industrial automation)
EnergyBus-CiA 454 (used for light electrical vehicles)
ISOBUS-ISO 11783 (agriculture)
ISO-TP-ISO 15765-2 (Transport protocol for automotive diagnostic)
SAE J1939 (In-vehicle network for buses and trucks)
MilCAN
NMEA 2000-IEC 61162-3 (marine industry)
Unified Diagnostic Services (UDS)-ISO 14229 (automotive diagnostics)
CANaerospace-Stock (for the aviation industry)
CAN Kingdom-Kvaser (embedded control system)
CCP/XCP (automotive ECU calibration)
GMLAN-General Motors (for General Motors)
RV-C-RVIA (used for recreational vehicles)
SafetyBUS p-Pilz (used for industrial automation)
UAVCAN (aerospace and robotics)

"Controller" or "Control Circuit" generally refers to a mechanical or electronic device configured to control the behavior of another mechanical or electronic device. A controller or a control circuit may be configured to provide signals or other electrical impulses that may be received and interpreted by the controlled device to indicate how it should behave. Controllers or control circuits may control other controllers or control circuits such as in a master-slave configuration where the master is configured to control a slave based on input from the master.

"Control Logic" generally refers to hardware or software configured to implement an automatic decision making process by which inputs are considered, and corresponding outputs are generated. The output may be used for any suitable purpose such as to provide specific commands to machines or processes specifying specific actions to take. Examples of control logic include computer programs executed by a processor to accept commands from a user and generate output according to the logic implemented in the program as executed by the processor. In another example, control logic may be implemented as a series of logic gates, microcontrollers, and the like, electrically connected together in a predetermined arrangement so as to accept input from other circuits or computers and produce an output according to the rules implemented in the logic circuits.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Door Sensor" generally refers to a sensor configured to detect whether a door is open or closed. Such sensors may be installed in vehicles, homes, businesses, and may be part of a security or monitoring system. Such sensors may include optical or mechanical switches, proximity sensors, or other such devices for detecting the position of a door from an open versus closed configuration.

"Diode" generally refers to a two terminal electrical device which allows current to flow in one direction, but prevents current from flowing in the opposite direction. Examples include p-n silicon junction diodes, light emitting diodes, Schottky diodes, and Zener diodes, to name a few.

"Dual Position Switch" generally refers to an electronic device that has two operating conditions. In one position the switch is "Open" and no connection is made across the terminals in the switch, and thus no power can flow through the switch. In the "Closed" position the switch terminals are connected and power can flow through the switch. Examples include mechanical switches such as Single Pole Single Throw (SPST) switches, Dual Pole Dual Throw (DPDT) switches. For example, two position mechanical switches such as Dual Inline Package (DIP) switches may be are arranged together in a single package with multiple individual dual position switches that are mechanically actuated between open and closed positions. In the closed position the contacts are physically touching and thus a circuit is completed and power can flow through the switch. In the open position the contacts are physically separated far enough apart to break the circuit thus interrupting the flow of power.

In another example, many solid-state devices such as a Bipolar Junction Transistor (BJT), a Metal Oxide Semiconducting Field Effect Transistor (MOSFET), or other similar to devices operate as dual position switches where the switching mechanism is actuated electromagnetically rather than by physically contacting two parts of a circuit together.

"Electrically connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Ground cable" generally refers to a cable electrically connecting to a circuit ground.

"J-560 Compliant cabling system" generally refers to a cable system with multiple individual wires forming separate circuits in a truck trailer conforming to the Society of Automotive Engineers (SAE) J-560 standard. The J-560 standard requires an 8 AWG chassis ground wire, typically colored white, a 10 AWG wire (typically red) that is dedicated to brake or stop lamps, and a 10 AWG wire (often blue) that is dedicated to provide continuous ABS primary power and, alternatively, power for auxiliary devices. Four 12 AWG wires are commonly included (such as the yellow, green, brown, and black) wires, with the yellow wire dedicated to the left turn signal and hazard lamps, the green wire dedicated to the right turn signal and hazard lamps, the brown wire dedicated for tail and license plates and clearance and/or side marker lamps, and the black wire dedicated for clearance, side marker, and identification lamps. Thus, the conventional J-560 compliant cable system has an aggregate cross-sectional area of about 32 mm$^2$ calculated as the aggregate of four metallic 12 AWG cables each with a cross-sectional area of 3.3 mm$^2$, two metallic 10 AWG cables each with a cross-sectional area of 5.3 mm$^2$, one metallic 8 AWG cables each with a cross-sectional area of 8.4 mm$^2$.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-hallide, mercury-vapor, sulfur, neon, sodium-vapor, or others.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Liquid Level Sensor" generally refers to a sensor to measure the depth of liquid in a container. Examples include optical level switches, ultrasonic sensors, float switches, and conductive sensors to name a few non-limiting examples.

"LED Lamp" generally refers to an electrical device that uses Light Emitting Diodes (LEDs) to produce light using electrical power. A lamp may include a single LED, or multiple LEDs.

"LED fault signal" generally refers to a signal that is used to indicate the failure of an LED. The LED fault signal can take the form of power to illuminate a fault LED, a data message (such as via a serial communication protocol or other), a mechanical indicator, or other. The LED fault signal can be used to communicate a failed LED to an onboard computer or display system such as may be found in the cabin of a vehicle or a trailer.

"Local Interconnect Network (LIN)" generally refers to a network protocol used for communication between components in vehicles, usually by means of serial communication. LIN may be used also over the vehicle's battery power-line with a special LIN over DC powerline (DC-LIN) transceiver. Features of the protocol include, but are not limited to a single master, up to 16 slaves, Slave Node Position Detection (SNPD) that allows node address assignment after power-up, single wire communications greater than 19.2 Kbits/s with a bus length of 40 meters or less, guaranteed latency times, variable length of data frame (2, 4 and 8 byte frames), multi-cast reception with time synchronization, without crystals or ceramic resonators, data checksum and error detection, detection of defective nodes, and an operating voltage of 12V.

A LIN may be implemented as a single-wire network such as an asynchronous serial network described on ISO 9141. A microcontroller may generate all needed LIN data by software and is connected to the LIN network via a LIN transceiver. The LIN Master may use one or more predefined scheduling tables to start sending and receiving to the LIN bus. These scheduling tables contain relative timing information, where the message sending is initiated. One LIN Frame consists of the two parts header and response. The header is always sent by the LIN Master, while the response is sent by either one dedicated LIN-Slave or the LIN master itself.

Transmitted data within the LIN is transmitted serially as eight bit data bytes with one start bit, one stop-bit, and no parity (break field does not have a start bit and stop bit). Bit rates vary within the range of 1 kbit/s to 20 kbit/s, or more. Data on the bus is divided into recessive (logical HIGH) and dominant (logical LOW). The time normal is considered by the LIN Masters stable clock source, the smallest entity is one bit time (e.g. 52 µs at 19.2 kbit/s).

Data may be transferred across the bus in fixed form messages of selectable lengths. The master task may transmit a header that consists of a break signal followed by synchronization and identifier fields. The slaves may respond with a data frame that consists of between 2, 4 and 8 data bytes plus 3 bytes of control information. Frame types include, unconditional frame, Event-triggered frame, Sporadic frame, Diagnostic frame, User-defined frame, Reserved frame. One example of a standard LIN is maintained by the International Organization for Standardization (ISO) as ISO/AWI 17987

"Maintenance Interface" generally refers to software or hardware configured perform maintenance functions. This may include establishing and/or maintain communication links with remote computing devices. Such communication links may be wired or wireless, and may be used for any suitable maintenance purpose such as to send information to the remote computing device, and to retrieve updated software such as in the case of firmware upgrade delivered wirelessly. A maintenance interface may include a wireless module or interface with software for managing the specific tasks of maintaining a wireless connection to a computer network in order to perform the maintenance functions.

"Master/Slave" generally refers to a model for a communication protocol in which one device or process (known as the master) controls one or more other devices or processes (known as slaves). In some implementations, such as in a Local Interconnect Network (LIN) only one node in a communication network may operate as a master and once the master/slave relationship is established, the direction of control is always from the master to the slave(s). In other examples, such as in the case of a Control Area Network (CAN), the concept of a master and slave is less strict because all nodes on the CAN may operate as a "master" issuing commands to other "master" nodes. As used herein, a master sends commands to a slave, irrespective of whether the networking protocol used strictly adheres to this requirement.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips.

Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems.

Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as:

1. a central processing unit-ranging from small and simple processors with registers as small as 4 bits or list, to complex processors with registers that are 32, 64, or more bits
2. volatile memory (RAM) for data storage
3. ROM, EPROM, EEPROM or Flash memory for program and operating parameter storage
4. discrete input and output bits, allowing control or detection of the logic state of an individual package pin
5. serial input/output such as serial ports (UARTs)
6. other serial communications interfaces like I$^2$C, Serial Peripheral Interface and Controller Area Network for system interconnect
7. peripherals such as timers, event counters, PWM generators, and watchdog
8. clock generator-often an oscillator for a quartz timing crystal, resonator or RC circuit
9. many include analog-to-digital converters, some include digital-to-analog converters
10. in-circuit programming and in-circuit debugging support "Mode Selector" generally refers to a device configured to provide input useful for selecting an operating mode for a system, or a device operating within the system. In one example, the mode selector is an array of physical switches that together may be used to specify a string of binary data that may be used to identify a selected mode. The selected mode may be changed by adjusting the position of the switches. In another example, a mode selector may be a software program or logic circuit configured to adjust a data value stored in memory and to update that data value when other devices seek to adjust the current operating mode.

"Mode Identifier" generally refers to a physical or logical indicator that identifies the operational mode for a device or a system. Examples include a string of binary bits stored in a memory represented as a number or string of characters identifying current mode. In another example, physical arrangement of dual position switches may operate as a mode identifier.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Nosebox" generally refers to an enclosure that serves a junction for electronic circuits and/or physical connections running between a truck and a trailer. The nosebox is generally located towards the front of the trailer, but may be positioned in any suitable location on the trailer. The nosebox can be one single enclosure, or may include multiple separate enclosures located in the same or in separate locations located on the trailer. The nosebox generally provides a common ground circuit between the truck and the trailer cable system. It may also provide a single location on the trailer by which the trailer cable system may electrically connect with one or more power circuits provided by the truck. For example, a nose box may provide a J-560 compliant connection, or alternatively, a nose box may include a four pin, five pin, or other similar connections.

"Optionally" as used herein means discretionary; not required; possible, but not compulsory; left to personal choice.

"Outage Detection Circuit" generally refers to a circuit configured to detect unusual conditions in components connected to a circuit and thereby to determine whether the component has failed. For example, an outage detection circuit may be configured to detect when an individual LED has failed, or when a significant number of individual LEDs in an LED lamp connected to a trailer cable system have failed requiring replacement of the entire LED lamp.

"Pigtail" generally refers to a cable that has a connector on one end and loose wires on the other. It is designed to patch into an existing line or to terminate the ends of wire or bundle of wires.

"Polymeric Material" or "Polymer" generally refers to naturally occurring and synthetic materials characterized by a molecular structure formed from the repetition of subunits bonded together. Examples include, but are not limited to, naturally occurring substances such as amber, silk, hemp, and many kinds of synthetic substances such polyethylene, polypropylene, polystyrene, polyvinyl chloride, synthetic rubber, phenol formaldehyde resin (or Bakelite), neoprene, nylon, polyacrylonitrile, silicone, and the like.

"Predominately" as used herein is synonymous with greater than 50%.

"Pressure Sensor" generally refers to a device configured to detect pressure applied to the device. Such devices generally include a pressure sensitive element to determine the actual pressure applied to the sensor and may also include components configured to convert this information into an output signal. Examples of pressure sensors include strain gauge based sensors, capacitive sensors, piezo-resistive pressure sensors, resonant pressure sensors and the like.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qualcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Rear-facing" generally refers to facing away from the rear of a vehicle or structure.

"Refrigeration Sensor" generally refers to temperature sensors configured to report temperature data in a refrigerated environment.

"Remote Computing Device" generally refers to a computing device that is located in a separate locating from other devices it may be in communication via any suitable communication link such as a wireless or wired network.

"Reverse Lamp" generally refers to a rear-facing lamp on a vehicle that is configured to illuminate the area behind the vehicle, and to warn others nearby that the vehicle is in the reverse mode and may soon begin moving backward.

"Running Lamp" generally refers to a lamp on a vehicle that is activated to provide others nearby with additional visual cues as to the size of the vehicle and it's direction of travel. Such lamps commonly emit white, yellow, or amber light.

"Sensor" generally refers to a transducer configured to sense or detect a characteristic of the environment local to the sensor. For example, sensors may be constructed to detect events or changes in quantities or sensed parameters providing a corresponding output, generally as an electrical or electromagnetic signal. A sensor's sensitivity indicates how much the sensor's output changes when the input quantity being measured changes.

"Sense parameter" generally refers to a property of the environment detectable by a sensor. As used herein, sense parameter can be synonymous with an operating condition, environmental factor, sensor parameter, or environmental condition. Sense parameters may include temperature, air pressure, speed, acceleration, the presence or intensity of sound or light or other electromagnetic phenomenon, the strength and/or orientation of a magnetic or electrical field, and the like.

"Signal" generally refers to a function or means of representing information. It may be thought of as the output of a transformation or encoding process. The concept generally includes a change in the state of a medium or carrier that conveys the information. The medium can be any suitable medium such as air, water, electricity, magnetism, or electromagnetic energy such as in the case of radio waves, pulses of visible or invisible light, and the like.

As used herein, a "signal" implies a representation of meaningful information. Arbitrary or random changes in the state of a carrier medium are generally not considered "signals" and may be considered "noise". For example, arbitrary binary data streams are not considered as signals. On the other hand, analog and digital signals that are representations of analog physical quantities are examples of signals. A signal is commonly not useful without some way to transmit or send the information, and a receiver responsive to the transmitter for receiving the information.

In a communication system, for example, a transmitter encodes a message to a signal, which is carried to a receiver by the communications channel. For example, the words "The time is 12 o'clock" might be the message spoken into a telephone. The telephone transmitter may then convert the sounds into an electrical voltage signal. The signal is transmitted to the receiving telephone by wires, at the receiver it is reconverted into sounds.

Signals may be thought of as "discrete" or "continuous." Discrete-time signals are often referred to as time series in other fields. Continuous-time signals are often referred to as continuous signals even when the signal functions are not continuous, such as in a square-wave signal.

Another categorization is signals which are "discrete-valued" and "continuous-valued". Particularly in digital signal processing a digital signal is sometimes defined as a sequence of discrete values, that may or may not be derived from an underlying continuous-valued physical process. In other contexts, digital signals are defined as the continuous-time waveform signals in a digital system, representing a bit-stream. In the first case, a signal that is generated by means of a digital modulation method may be considered as converted to an analog signal, while it may be considered as a digital signal in the second case.

"Socket" generally refers a device into which something fits in order to electrically and/or physically connect another electrical device to a circuit.

"Stop-tail-turn Lamp" or "STT Lamp" generally refers to a lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Switch" or "Switching Device" generally refers to an electrical component that can break an electrical circuit. A switch may interrupt the current in the circuit, and/or divert the flow of current from one conductor electrically coupled to one circuit, to another separate conductor electrically coupled to a separate circuit. The mechanism of a switch may be operated directly by a human operator (e.g. turning on a light switch, pressing a keyboard button, or by moving a hand to break a beam of light), may be operated by one object moving adjacent to or relative to another object such as a door-operated switch, or may be operated by a sensor detecting changes in a sensed parameter such as pressure, temperature, magnetic or electrical field strength, and the like.

A switch may divert current from on conductor to another by any suitable means such as by physically moving a switching element contacting one conductor electrically coupled to a first circuit, to directly contact a different conductor electrically coupled to a second circuit. This may occur by physical mechanical means (e.g. one or more metal contacts moving inside a switch, relay, or contactor), or by changing the electrical properties of a material such as a semiconducting material to temporarily break and/or divert a flow of current. For example, a transistor may operate as a switch diverting the flow of electricity when a voltage or current applied to one pair of the transistor's terminals changes the current through another pair of terminals.

"Rear Position Lamp" or "Tail Lamp" generally refers to rear-facing lamps of a vehicle that are generally configured to emit red light. Tail lamps are generally configured to be active when front position lamps are lit, or when the headlamps are on. Rear position lamps may be combined with a vehicle's stop lamps or separate from them. In combined-function installations, the lamps produce brighter red light for the stop lamp function and dimmer red light for the rear position lamp function. As used herein, the term generally refers to a tail lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Temperature Sensor" generally refers to a device configured to sense temperature. Examples include thermocouples, resistor temperature detectors, thermistors, thermometers, semiconductors, and IR Sensors.

"Terminal" generally refers to a plug, socket or other connection (male, female, mixed, hermaphroditic, or otherwise) for mechanically and electrically connecting two or more wires or other conductors.

"Trailer" generally refers to a vehicle without an engine, often in the form of a flat frame or a container, which can be pulled by another vehicle.

"Transceiver" generally refers to a device that performs both transmitting and receiving functions. Examples include wireless communications devices such as cellular telephones, cordless telephone sets, handheld two-way radios, mobile two-way radios, as well as in the context of computer networking hardware such as in the case of devices configured to transmit and receive data packets. In another example, term is used in reference to transmitter/receiver devices in cable or optical fiber systems.

"Truck" generally refers to a powered truck (also known as a tractor or cab) for pulling a trailer.

"Turn Signal Lamp" generally refers to lamps positioned on a vehicle or trailer to warn of a change in the direction of travel when activated. Sometimes referred to as "direction indicators" or "directional signals", or as "directionals", "blinkers", "indicators" or "flashers"—turn signal lam blinking lamps mounted near the left and right front and rear corners of a vehicle or trailer. As used herein, the term generally refers to a turn signal lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108

"Unitary Molded Structure" generally refers to a structure formed as a single or uniform entity.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

REFERENCE NUMBERS 100 cable system for a trailer
105 truck
108 nose box
111 trailer
114 truck power connector
120 trailer component connector
125 trailer component
128 power cable
131 ground cable
134 communication cable
137 optional additional communication cable
200 nose box
202 control input
205 separate power cable connection
214 control command
216 ground cable connection
220 master control circuit
300 trailer component connector
305 address
308 mode
311 power connection terminal
314 ground connection terminal
320 slave control circuit
400 master control circuit
405 master transceiver
408 master microcontroller
500 slave control circuit
505 slave transceiver
508 slave microcontroller
600 slave control circuit
602 control command
605 target mode identifier
608 switch
611 mode identifier
615 comparison logic
700 cable system implemented using a Control Area Network (CAN)
703 master control circuit
706 CAN protocol
708 slave control circuit
710 CAN master controller
715 CAN low communication cable
718 CAN high communication cable
722 CAN slave controller
800 cable system implemented using a Local Interconnect Network (LIN)
803 LIN master control circuit
806 LIN Protocol
808 LIN slave control circuit
810 LIN master controller
818 LIN communication cable
822 LIN slave controller
900 master control circuit
901 master transceiver
903 power cable
905 power junction
907 diode array
908 master microcontroller
910 voltage regulator
915 power circuit
918 master I/O circuit
1000 slave control circuit
1001 slave transceiver
1003 slave microcontroller
1005 component power circuit
1007 component control output circuit
1010 component activation circuit
1012 switching device
1014 control logic
1015 slave I/O circuit
1017 voltage regulator
1020 mode input lines
1021 power circuit
1022 address input lines
1024 mode interface
1026 address interface
1028 remote computing device
1030 communication link
1100 cable system
1103 master control circuit
1105 master control logic
1106 address map
1110 component connector
1112 connector address
1114 trailer component
1120 component connector
1122 connector address
1124 trailer component
1130 component connector
1132 connector address
1134 trailer component
1140 component connector
1142 connector address
1144 trailer component
1150 component connector
1152 connector address
1154 trailer component
1160 control command
1161 command address
1162 command address
1163 command address
1164 command address
1165 command address
1170 control command
1171 command address
1172 command address
1200 cable system
1203 master control circuit
1205 master control logic
1206 mode map
1210 component connector
1212 connector mode
1214 connector mode
1218 trailer component
1220 component connector
1222 connector mode
1224 connector mode
1228 trailer component
1230 component connector
1234 connector mode 1236 connector mode
1238 trailer component
1240 component connector
1246 connector mode
1248 trailer component
1250 component connector
1252 connector mode
1256 connector mode
1258 trailer component
1260 control command
1262 command mode
1300 connector maintenance aspects
1303 remote computing device
1304 software update
1305 communication link
1308 component connector
1310 operating history
1312 maintenance interface
1315 memory
1318 communication interface
1400 trailer component connector
1403 power connection terminal
1405 ground connection terminal
1408 unitary molded structure
1412 switch
1415 communication cable
1417 optional second communication cable
1420 component power connection cable
1424 component ground connection cable
1500 trailer components
1502 lamp(s)
1505 sensors
1507 braking system
1509 cameras
1512 refrigeration system
1513 running lamps
1515 interior illumination lamps
1516 clearance lamps
1517 backup lamps
1519 license plates
1521 stop lamps
1523 tail lamps
1525 right turn lamps
1527 left turn lamps
1528 stop-tail-turn
1529 temperature sensor
1531 door sensor
1533 cargo sensor
1535 humidity sensor
1537 tank level sensor
1539 proximity sensor
1541 tire pressure
1543 Anti-lock Brakes (AB S) controller
1545 ABS lamp
1547 pressure sensor
1549 temperature sensor
1551 controller
1553 refrigerant level
1555 backup camera
1557 side camera
1600 operational aspects of a trailer lamp
1601 master control circuit
1602 command
1603 cable system
1605 operational status
1610 lamp
1700 operational aspects of a temperature sensor
1701 master control circuit
1702 command
1703 cable system
1705 temperature data
1708 operational status
1710 temperature sensor
1800 operational aspects of a trailer mounted camera
1801 master control circuit
1802 command
1803 cable system
1805 image data
1808 operational status
1810 camera
1900 master control circuit maintenance aspects
1903 operating history
1904 software update
1905 remote computing device
1907 communication link
1908 master control circuit
1909 maintenance interface
1911 fault detection circuit
1914 memory
1915 operational status
1916 component data
2000 dry van or box type semi-trailer
2002 front clearance lamps
2004 upper front left side marker lamps
2006 upper intermediate left side marker lamps
2008 lower front left side marker lamps
2010 side marking
2012 intermediate side reflex reflectors
2014 lower intermediate side marker lamps
2016 side marking
2018 left side rear marker lamps and reflex reflectors
2022 left rear clearance lamps
2024 rear identification lamps
2026 right rear clearance lamps
2028 rear upper body marking
2030 rear upper body marking
2032 rear lower body marking
2034 left rear stop turn tail lamps and reflex reflectors
2036 right rear stop turn tail lamps and reflex reflectors
2038 license plate lamp(s)
2040 bumper bar marking
2200 bulk liquid or tanker semi-trailer
2400 gooseneck flatbed semi-trailer

What is claimed is:

1. A cable system for a trailer, comprising:
a power cable, a ground cable, and at least one communication cable mounted to the trailer;
a nosebox mounted to the trailer, the nosebox having:
 a) seven connection terminals corresponding to trailer connection terminals of a truck tractor, the seven connection terminals including a ground cable connection and six separate power cable connections; and
 b) a master control circuit mounted in the nosebox, the master control circuit electrically connected to the seven connection terminals, the power cable, ground cable, and the at least one communication cable, wherein the master control circuit is configured to accept control input from the truck tractor via the six separate power cable connections and to generate component control commands for controlling one or more individual trailer components mounted to the trailer, and wherein the master control circuit is configured to send the control commands to the trailer components via the at least one communication cable;

multiple trailer component connectors, each having:
a) a power connection terminal for electrically connecting one of the individual trailer components to the power cable;
b) a ground connection terminal for electrically connecting one of the individual trailer components to the power cable;
c) a slave control circuit electrically connected to the power cable, ground cable, and the at least one communication cable and configured to receive the control commands sent by the master control circuit and to selectively control one of the individual trailer components according to the control commands; and wherein the slave control circuits define a mode identifier, and wherein the control commands sent by the master control circuit include a target mode identifier specifying the trailer component the control command is intended for, and wherein the slave control circuits are configured to:
compare the target mode identifier in the control commands received from the master control circuit with the mode identifier of the slave control circuit; and
electrically connect the individual trailer component to the power cable when the target mode identifier matches the mode identifier of the slave control circuit.

2. The cable system of claim 1, wherein the master control circuit includes:
a master microcontroller; and
a master transceiver electrically connected to the master microcontroller and to the at least one communication cable.

3. The cable system of claim 2, wherein the slave control circuit includes:
a slave microcontroller; and
a slave transceiver electrically connected to the slave microcontroller and to the at least one communication cable;
wherein the slave microcontroller receives the control commands sent by the master transceiver using the slave transceiver.

4. The cable system of claim 1, comprising:
two communication cables electrically connected to the master control circuit, wherein the master control circuit includes a Control Area Network (CAN) controller electrically connected to the communication cables, and/or wherein the slave control circuit includes a slave CAN controller, and wherein the master and slave control circuits communicate using a CAN protocol.

5. The cable system of claim 1,
one communication cable electrically connected to the master control circuit, wherein the master control circuit includes a Local Interconnect Network (LIN) controller electrically connected to the communication cable, and/or wherein the slave control circuit includes a slave LIN controller, and wherein the master and slave control circuits communicate using a LIN protocol.

6. The cable system of claim 1, wherein the one or more trailer components includes at least five rear-facing lamps mounted at the rear of the trailer, the at least five rear-facing lamps mounted in five separate trailer component connectors having separate addresses, and wherein the master control circuit is configured to:
accept brake input from the truck tractor; and
send control commands with target addresses associated with the at least five rear-facing lamps.

7. The cable system of claim 1, wherein the slave control circuits of the multiple trailer component connectors include multiple dual position switches for defining the mode identifier of the slave control circuits.

8. The cable system of claim 1, wherein the master control circuit includes control logic configured to process input from the truck tractor and generate one or more control commands specific to one or more of the individual trailer components.

9. The cable system of claim 8, wherein the master control circuit includes a maintenance interface configured to receive the control logic from a remote device.

10. The cable system of claim 1, wherein the individual trailer components include vehicle stop-tail-turn lamps, vehicle turn signal lamps, vehicle brake lamps, vehicle tail lamps, vehicle running lamps, vehicle anti-lock brakes, vehicle interior illumination lamps, vehicle reverse lamps, or any combination thereof.

11. The cable system of claim 1, wherein the individual trailer components include an antilock brake system controller, pressure sensors, temperature sensors, door sensors, cargo sensors, cargo length sensors, liquid level sensors, refrigeration sensors, or any combination thereof.

12. The cable system of claim 1, wherein the power connection terminal, the ground connection terminal, and the slave control circuit are partially or fully contained within a unitary molded structure.

13. The cable system of claim 1, wherein one of the individual trailer components is a lamp having one or more LEDs, and the slave control circuit includes an outage detection circuit configured to determine an operational status of the one or more LEDs, and wherein the slave control circuit is configured to send data about the operational status to the master control circuit using the at least one communication cable.

14. The cable system of claim 1, wherein one of the individual trailer components is a temperature sensor, and the slave control circuit is configured to accept temperature data from the temperature sensor and to send the temperature data to the master control circuit using the at least one communication cable.

15. The cable system of claim 1, wherein one of the individual trailer components is a backup camera, and the slave control circuit is configured to accept image data from the backup camera and to send the image data to the master control circuit using the at least one communication cable.

16. A connector for trailer components in a truck trailer, comprising:
a main power connection, a ground connection, and at least one communication cable connection; and
a component power connection for electrically connecting an individual trailer component to power;
a component ground connection for electrically connecting the individual trailer component to ground;
a slave control circuit electrically connected to the component power connection, the component ground connection, the main power connection, the ground connection, and the at least one communication cable connection, wherein the slave control circuit is configured to:

a) receive a control command sent by a master control circuit using the at least one communication cable connection, wherein the control commands include a mode identifier; and b) electrically connect the component power connection to the main power connection to provide power to the individual trailer component when the mode identifier in the control command matches a component mode identifier stored in the slave control circuit; and a mode selector configured to accept input defining the component mode identifier.

17. The connector of claim 16 having a housing, wherein one end of the main power connection, ground connection, at least one communication cable connection, component power connection and component ground connection terminates within the housing, wherein the slave control circuit is enclosed within the housing, and wherein a portion of the mode selector extends outside the housing.

18. The connector of claim 17, wherein the housing includes a unitary molded structure formed from polymeric material.

19. The connector of claim 16, wherein the mode selector includes multiple dual position switches, and wherein the mode identifier is defined by the positions of the switches.

20. The connector of claim 16, comprising:
a maintenance interface configured to receive the component mode identifier from a remote device; and
a memory configured to store the component mode identifier.

21. The connector of claim 16, wherein the main power connection, ground connection, and at least one communication cable connection are electrically connected to a master control circuit mounted in a trailer nosebox of the trailer, wherein the master control circuit is configured to accept control input from a truck tractor, and wherein the master control circuit is configured to generate different component control commands specific to one or more individual trailer components based on the control input.

22. The connector of claim 21, wherein the trailer nosebox includes:
seven connection terminals corresponding to trailer connection terminals of a truck tractor, the seven connection terminals including a ground cable connection and six separate power cable connections.

23. The connector of claim 16, wherein the individual trailer component is a lamp having one or more LEDs, and the slave control circuit includes an outage detection circuit configured to determine an operational status of the one or more LEDs, and wherein the slave control circuit is configured to send data about the operational status to the master control circuit using the at least one communication cable.

24. The connector of claim 16, wherein the individual trailer component is a temperature sensor, and the slave control circuit is configured to accept temperature data from the temperature sensor and to send the temperature data to the master control circuit using the at least one communication cable.

25. The connector of claim 16, wherein the individual trailer component is a backup camera, and the slave control circuit is configured to accept image data from the backup camera and to send the image data to the master control circuit using the at least one communication cable.

* * * * *